(12) United States Patent
Langlois et al.

(10) Patent No.: US 12,204,086 B2
(45) Date of Patent: *Jan. 21, 2025

(54) APPARATUS AND METHOD OF ESTIMATING VALUES FROM IMAGES

(71) Applicant: ILLUMINA, INC., San Diego, CA (US)

(72) Inventors: Robert Langlois, San Diego, CA (US); Bo Lu, San Diego, CA (US); Hongji Ren, San Diego, CA (US); Joseph Pinto, Solana Beach, CA (US); Simon Prince, Carlsbad, CA (US); Austin Corbett, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,088

(22) Filed: Aug. 21, 2023

(65) Prior Publication Data

US 2023/0393379 A1 Dec. 7, 2023

Related U.S. Application Data

(63) Continuation of application No. 17/110,409, filed on Dec. 3, 2020, now Pat. No. 11,768,364.

(Continued)

(51) Int. Cl.
*G02B 21/36* (2006.01)
*G02B 21/14* (2006.01)
*G06T 7/00* (2017.01)

(52) U.S. Cl.
CPC ........... *G02B 21/367* (2013.01); *G02B 21/14* (2013.01); *G06T 7/0012* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS 7,230,695 B2 * 6/2007 Ikuta ................... G03F 7/70958
430/5
8,941,720 B2 * 1/2015 Chiang ................. G06T 3/4007
348/46

(Continued)

FOREIGN PATENT DOCUMENTS

WO  WO 2010/101894 A2  9/2010

OTHER PUBLICATIONS

Gustafsson, Mats GL. "Surpassing the lateral resolution limit by a factor of two using structured illumination microscopy." *Journal of microscopy* 198.2 (2000): 82-87.

(Continued)

*Primary Examiner* — Tsung Yin Tsai
(74) *Attorney, Agent, or Firm* — Frost Brown Todd LLP

(57) ABSTRACT

A method is used to generate a distortion model for a structured illumination microscopy (SIM) optical system. A sliding window is moved in relation to a plurality of images to define a plurality of sub-tiles. Each sub-tile represents a portion of the corresponding image. Parameters are estimated for each sub-tiles. The parameters include two or more parameters selected from the group consisting of modulation, angle, spacing, phase offset, and phase deviation. A full width at half maximum (FWHM) value associated with each sub-tile is estimated. A distortion model is estimated, based at least in part on a combination of the estimated parameters and FWHM values stored in the predetermined format and an estimated center window parameter. A two-dimensional image may be generated, based at least in part on the estimated distortion model. The two- (Continued)

dimensional image may include representations indicating where distortions occur in the optical system.

20 Claims, 17 Drawing Sheets

Related U.S. Application Data

(60) Provisional application No. 62/944,687, filed on Dec. 6, 2019.

(56) References Cited

U.S. PATENT DOCUMENTS

| | | | |
|---|---|---|---|
| 9,360,660 B2* | 6/2016 | Yi | G01N 21/64 |
| 9,540,690 B2 | 1/2017 | Earney et al. | |
| 9,541,374 B2 | 1/2017 | Brueck et al. | |
| 10,005,083 B2 | 6/2018 | Earney et al. | |
| 10,261,018 B2 | 4/2019 | Earney et al. | |
| 10,520,714 B2* | 12/2019 | Shroff | G02B 21/0044 |
| 2002/0135780 A1* | 9/2002 | Budach | G01N 21/6452 |
| | | | 356/521 |
| 2006/0007433 A1* | 1/2006 | Ikuta | G03F 7/70591 |
| | | | 430/5 |
| 2009/0135432 A1* | 5/2009 | Betzig | G01N 21/6458 |
| | | | 356/521 |
| 2011/0182529 A1* | 7/2011 | Kempe | G02B 21/0032 |
| | | | 382/274 |
| 2012/0194646 A1* | 8/2012 | Chiang | G02B 21/008 |
| | | | 348/46 |
| 2013/0314717 A1* | 11/2013 | Yi | G01N 21/64 |
| | | | 356/479 |
| 2015/0255751 A1* | 9/2015 | Schwamb | H10K 59/874 |
| | | | 257/40 |
| 2016/0376247 A1 | 12/2016 | Kang et al. | |
| 2018/0214869 A1 | 8/2018 | Earney et al. | |
| 2019/0195799 A1 | 6/2019 | Earney et al. | |
| 2021/0173196 A1 | 6/2021 | Langlois et al. | |

OTHER PUBLICATIONS

Gustafsson, Mats GL, et al. "Three-dimensional resolution doubling in wide-field fluorescence microscopy by structured illumination." *Biophysical journal* 94.12 (2008): 4957-4970.

Wicker, Kai. "Non-iterative determination of pattern phase in structured illumination microscopy using auto-correlations in Fourier space." *Optics express* 21.21 (2013): 24692-24701.

Wicker, Kai, et al. "Phase optimisation for structured illumination microscopy." *Optics express* 21.2 (2013): 2032-2049.

Yeh, Li-Hao, Lei Tian, and Laura Waller. "Structured illumination microscopy with unknown patterns and a statistical prior." *Biomedical optics express* 8.2 (2017): 695-711.

International Search Report and Written Opinion dated Mar. 23, 2021, for International Application No. PCT/US2020/062970, 14 pages.

* cited by examiner

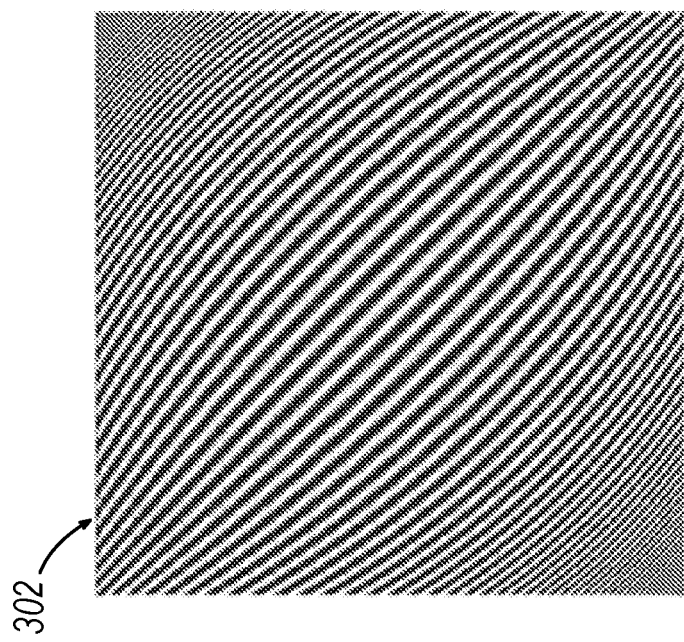
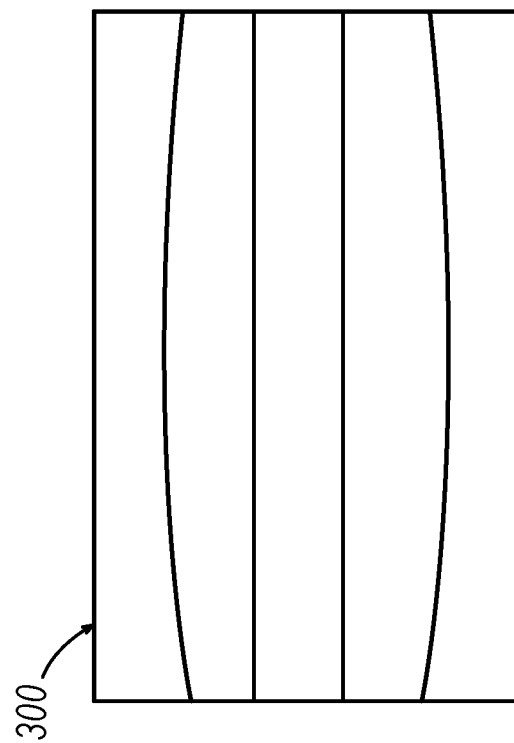
FIG. 6A

APPARATUS AND METHOD OF ESTIMATING VALUES FROM IMAGES

RELATED APPLICATIONS

This application is a continuation of U.S. patent application Ser. No. 17/110,409, entitled "Apparatus and Method of Estimating Values from Images." filed Dec. 3, 2020, the disclosure of which is incorporated by reference herein, and which claims priority to U.S. Provisional Pat. App. No. 62/944,687, entitled "Apparatus and Method of Estimating Values from Images," filed Dec. 6, 2019, the disclosure of which is incorporated by reference herein, in its entirety.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Structured illumination microscopy (SIM) is a class of computational imaging algorithm that reconstructs super resolution images from multiple lower-resolution source images. To ensure successful reconstruction, the source raw images should be of high quality. High quality raw images require careful tuning, calibration, and assessment of the optics performance of the imaging instrument. In addition to conventional imaging instrument characterization, the SIM imaging optics have additional components that need to be further characterized and validated.

SUMMARY

It may be desirable to provide systems and methods for promoting quality control and calibration with imaging optics and associated optical components within a SIM system, particularly a SIM system that is used for imaging biological samples such as nucleotide sequences. Described herein are devices, systems, and methods for processing images captured using SIM to overcome the pre-existing challenges and achieve the benefits as described herein.

An implementation relates to a method that includes receiving a plurality of images captured using structured illumination microscopy (SIM) in an optical system, each image of the plurality of images having a first field of view. The method further includes defining a window, the window defining a second field of view representing a portion of the first field of view such that the second field of view is smaller than the first field of view. The method further includes moving the window in relation to each image of a plurality of images. The method further includes capturing a plurality of sub-tiles from each image of the plurality of images while moving the window in relation to each image of the plurality of images, each sub-tile of the plurality of plurality of sub-tiles representing a portion of the corresponding image of the plurality of images, the portion represented by each sub-tile of the plurality of sub-tiles being defined by the second field of view at a position corresponding to a moment at which the sub-tile of the plurality of sub-tiles is captured. The method further includes estimating parameters associated with each sub-tile of the plurality of sub-tiles, the parameters including two or more parameters selected from the group consisting of modulation, angle, spacing, phase offset, and phase deviation. The method further includes estimating a full width at half maximum (FWHM) value associated with each sub-tile of the plurality of sub-tiles. The method further includes storing the estimated parameters and FWHM values in a predetermined format.

In some implementations of a method, such as that described in the preceding paragraph of this summary, the plurality of images comprising twelve images.

In some implementations of a method, such as any of those described in any of the preceding paragraphs of this summary, the plurality of images including a first set of images associated with a first color and a second set of images associated with a second color.

In some implementations of a method, such as any of those described in any of the preceding paragraphs of this summary, the plurality of images including a first set of images associated with a first grating orientation and a second set of images associated with a second grating orientation.

In some implementations of a method, such as that described in the preceding paragraph of this summary, the method further includes capturing the plurality of images. The method further includes, while capturing the plurality of images, moving a light source relative to one or more phase masks from a first position to a second position, the first position providing the first grating orientation and the second position providing the second grating orientation.

In some implementations of a method, such as any of those described in any of the preceding paragraphs of this summary, the plurality of images including a first set of images associated with a first phase and a second set of images associated with a second phase.

In some implementations of a method, such as that described in the preceding paragraph of this summary, the method further includes capturing the plurality of images. The method further includes, while capturing the plurality of images, moving a reflective element from a first position to a second position, the first position providing the first phase and the second position providing the second phase.

In some implementations of a method, such as any of those described in any of the preceding paragraphs of this summary, the predetermined format comprises a table.

In some implementations of a method, such as that described in the preceding paragraph of this summary, the table is in the form of a two-dimensional table.

In some implementations of a method, such as any of those described in any of the preceding paragraphs of this summary, the method further includes estimating a center window parameter, the center window parameter corresponding to a central region within the first field of view.

In some implementations of a method, such as that described in the preceding paragraph of this summary, the method further includes estimating a distortion model based at least in part on a combination of the estimated parameters and FWHM values stored in the predetermined format and the estimated center window parameter.

In some implementations of a method, such as that described in the preceding paragraph of this summary, the estimating the distortion model including subtracting the estimated center window parameter from the estimated parameters and FWHM values stored in the predetermined format.

In some implementations of a method, such as that described in the preceding paragraph of this summary, the estimating the distortion model including fitting a quadratic surface function to the result of the subtracting.

In some implementations of a method, such as that described in the preceding paragraph of this summary, the fitting the quadratic surface function to the result of the subtracting comprising using a shrinkage estimator.

In some implementations of a method, such as any of those described in any of the preceding four paragraphs of this summary, the method further includes validating the estimated distortion model by calculating a coefficient of determination for the estimated distortion model and comparing the calculated coefficient of determination to a predetermined threshold value.

In some implementations of a method, such as any of those described in any of the preceding five paragraphs of this summary, the method further includes estimating a phase offset and applying the phase offset to the estimated distortion model.

In some implementations of a method, such as any of those described in any of the preceding six paragraphs of this summary, the method further includes generating a two-dimensional image based at least in part on the estimated distortion model, the two-dimensional image including representations indicating where distortions occur in the optical system.

In some implementations of a method, such as any of those described in any of the preceding seven paragraphs of this summary, the method further includes capturing a subsequent plurality of images using SIM in the optical system. The method further includes generating a high-resolution image based at least in part on the plurality of images, the generating the high-resolution image including adjusting data from the subsequent plurality of images based at least in part on the estimated distortion model.

In some implementations of a method, such as any of those described in any of the preceding paragraphs of this summary, the method further includes capturing a subsequent plurality of images using SIM in the optical system. The method further includes generating a high-resolution image based at least in part on the plurality of images, the generating the high-resolution image including adjusting data from the subsequent plurality of images based at least in part on the estimated parameters and FWHM values stored in the predetermined format.

In some implementations of a method, such as any of those described in any of the preceding two paragraphs of this summary, the subsequent plurality of images including images of nucleotides.

In some implementations of a method, such as any of those described in any of the preceding paragraphs of this summary, the method further includes capturing the plurality of images using SIM in the optical system, the received plurality of images including the captured plurality of images.

In some implementations of a method, such as that described in the preceding paragraph of this summary, the plurality of captured images are images of an optical target.

In some implementations of a method, such as that described in the preceding paragraph of this summary, the optical target includes a dye, and the capturing of the plurality of images includes exciting molecules in the dye.

In some implementations of a method, such as that described in the preceding paragraph of this summary, the dye has a mean emission wavelength, and exciting molecules in the dye includes emitting an excitation light toward the dye, the excitation light having a wavelength that is substantially longer than the mean emission wavelength of the dye.

In some implementations of a method, such as that described in the preceding paragraph of this summary, the dye includes Coumarin dye.

In some implementations of a method, such as that described in the preceding paragraph of this summary, the excitation light has a wavelength of at least approximately 520 nm.

In some implementations of a method, such as that described in the preceding paragraph of this summary, the method further includes observing green laser generated fringes at blue wavelengths.

In some implementations, an apparatus includes a first optical assembly to emit structured illumination toward a target. The first optical assembly includes a light emitting assembly, a first phase mask to impart a first pattern to light emitted by the light emitting assembly, a second phase mask to impart a second pattern to light emitted by the light emitting assembly, and a phase adjustment assembly to adjust a phase of light structured by the first phase mask and the second phase mask. The apparatus further includes a second optical assembly. The second optical assembly includes an image sensor to capture images of the target as illuminated by the first optical assembly. The apparatus further includes a processor. The processor is to receive a plurality of images captured using the image sensor, each image of the plurality of images having a first field of view. The processor is further to define a window, the window defining a second field of view representing a portion of the first field of view such that the second field of view is smaller than the first field of view. The processor is further to move the window in relation to each image of a plurality of images. The processor is further to capture a plurality of sub-tiles from each image of the plurality of images while moving the window in relation to each image of the plurality of images, each sub-tile of the plurality of plurality of sub-tiles representing a portion of the corresponding image of the plurality of images, the portion represented by each sub-tile of the plurality of sub-tiles being defined by the second field of view at a position corresponding to a moment at which the sub-tile of the plurality of sub-tiles is captured. The processor is further to estimate parameters associated with each sub-tile of the plurality of sub-tiles, the parameters including two or more parameters selected from the group consisting of modulation, angle, spacing, phase offset, and phase deviation. The processor is further to estimate a full width at half maximum (FWHM) value associated with each sub-tile of the plurality of sub-tiles. The processor is further to store the estimated parameters and FWHM values in a predetermined format.

In some implementations of an apparatus, such as that described in the preceding paragraph of this summary, the target includes a sample container.

In some implementations of an apparatus, such as that described in the preceding paragraph of this summary, the target includes a biological sample in the sample container.

In some implementations of an apparatus, such as any of those described in any of the preceding paragraphs of this summary, the light emitting assembly is to emit light in at least two channels.

In some implementations of an apparatus, such as that described in the preceding paragraph of this summary, the at least two channels including at least two colors, each color of the at least two colors being corresponding to a corresponding channel of the at least two channels.

In some implementations of an apparatus, such as any of those described in any of the preceding paragraphs of this summary, the first optical assembly further includes a grating switcher. The grating switcher is to selectively direct or permit light emitted from the light emitting assembly toward the first phase mask or the second phase mask.

In some implementations of an apparatus, such as that described in the preceding paragraph of this summary, the grating switcher includes at least one movable reflective element.

In some implementations of an apparatus, such as that described in the preceding paragraph of this summary, the grating switcher further includes a rotatable plate supporting the movable reflective element. The rotatable plate is rotatable to thereby selectively position the reflective element in relation to the first phase mask or the second phase mask, to thereby selectively direct or permit light emitted from the light emitting assembly toward the first phase mask or the second phase mask.

In some implementations of an apparatus, such as any of those described in any of the preceding paragraphs of this summary, the phase adjustment assembly includes a movable reflecting element.

In some implementations of an apparatus, such as that described in the preceding paragraph of this summary, the phase adjustment assembly further includes an actuator to move the movable reflecting element.

In some implementations of an apparatus, such as that described in the preceding paragraph of this summary, the actuator is to move the movable reflecting element along a linear path.

In some implementations of an apparatus, such as any of those described in any of the two preceding paragraphs of this summary, the actuator includes a piezoelectric element.

In some implementations of an apparatus, such as any of those described in any of the preceding paragraphs of this summary, the processor is further to estimate a center window parameter, the center window parameter corresponding to a central region within the first field of view.

In some implementations of an apparatus, such as that described in the preceding paragraph of this summary, the processor is further to estimate a distortion model based at least in part on a combination of the estimated parameters and FWHM values stored in the predetermined format and the estimated center window parameter.

In some implementations of an apparatus, such as that described in the preceding paragraph of this summary, the processor is further to estimate the distortion model by including subtracting the estimated center window parameter from the estimated parameters and FWHM values stored in the predetermined format.

In some implementations of an apparatus, such as that described in the preceding paragraph of this summary, the processor is further to estimate the distortion mode by fitting a quadratic surface function to the result of the subtracting.

In some implementations of an apparatus, such as that described in the preceding paragraph of this summary, the processor is further to estimate the distortion mode by fitting the quadratic surface function to the result of the subtracting comprising using a shrinkage estimator.

In some implementations of an apparatus, such as any of those described in any of the four preceding paragraphs of this summary, the processor is further to validate the distortion model by calculating a coefficient of determination for the estimated distortion model, and comparing the calculated coefficient of determination to a predetermined threshold value.

In some implementations of an apparatus, such as any of those described in any of the five preceding paragraphs of this summary, the processor is further to estimate a phase offset, and apply the phase offset to the estimated distortion model.

In some implementations of an apparatus, such as any of those described in any of the six preceding paragraphs of this summary, the processor is further to generate a two-dimensional image based at least in part on the estimated distortion model, the two-dimensional image including representations indicating where distortions occur in the optical system.

In some implementations of an apparatus, such as any of those described in any of the six preceding paragraphs of this summary, the processor is further to capture a subsequent plurality of images using SIM in the optical system, and generate a high-resolution image based at least in part on the plurality of images. Generating the high-resolution image includes adjusting data from the subsequent plurality of images based at least in part on the estimated distortion model.

In some implementations of an apparatus, such as any of those described in any of the preceding paragraphs of this summary, the processor is further to capture a subsequent plurality of images using SIM in the optical system, and generate a high-resolution image based at least in part on the plurality of images. Generating the high-resolution image including adjusting data from the subsequent plurality of images based at least in part on the estimated parameters and FWHM values stored in the predetermined format.

In some implementations, a method includes capturing a plurality of images using structured illumination microscopy (SIM) in an optical system. The plurality of captured images are images of an optical target. The optical target includes a dye. Capturing the plurality of images includes exciting molecules in the dye. The dye has a mean emission wavelength. Exciting molecules in the dye includes emitting an excitation light toward the dye. The excitation light has a wavelength that is substantially longer than the mean emission wavelength of the dye. The method further includes observing fringes in the plurality of images. The observed fringes are at a first wavelength associated with a first color. The observed fringes are generated by a light source emitting light at a second wavelength associated with a second color.

In some implementations of a method, such as that described in the preceding paragraph of this summary, the dye includes Coumarin dye.

In some implementations of a method, such as that described in the preceding paragraph of this summary, the excitation light has a wavelength of at least approximately 520 nm.

In some implementations of a method, such as any of those described in any of the three preceding paragraphs of this summary, the first color is blue and the second color is green.

In some implementations, a processor-readable medium includes contents that are configured to cause a computing system to process data by performing the method of any one or more of the methods described in any of the preceding paragraphs of this summary.

It should be appreciated that all combinations of the foregoing concepts and additional concepts discussed in greater detail below (provided such concepts are not mutually inconsistent) are contemplated as being part of the inventive subject matter disclosed herein and to achieve the benefits/advantages as described herein. In particular, all combinations of claimed subject matter appearing at the end of this disclosure are contemplated as being part of the inventive subject matter disclosed herein.

BRIEF DESCRIPTION OF THE DRAWINGS

The details of one or more implementations are set forth in the accompanying drawings and the description below. Other features, aspects, and advantages will become apparent from the description, the drawings, and the claims, in which:

FIG. 6A is a simplified depiction of bending parallel lines due to distortion of a lens that magnifies.

Figure 1A:
FIG. 1A depicts an example of a Moire fringe formation by using a grating with one-dimensional (1D) modulation.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

In some aspects, methods and systems are disclosed herein for promoting quality control and calibration with imaging optics and associated optical components within a SIM system, particularly a SIM system that is used for imaging biological samples such as nucleotide sequences.

In the context of imaging biological samples such as nucleotide sequences, SIM may provide the ability to resolve densely packed samples, from flow cells with fluorescent signals from millions of sample points, thereby reducing reagents needed for processing and increasing image processing throughput. In some cases, SIM may enable resolution of fluorescent samples that are packed more densely than the Abbe diffraction limit for resolving adjoining light sources. The biological samples may be in regularly spaced nanowells on a flow cell or they may be in randomly distributed clusters. Adjacent nanowells may be positioned closer together than the Abbe diffraction limit of the associated optical system. While the present example relates to biological samples on nanowells of a flow cell, the teachings herein may be applied to biological samples in various other arrangements; and in other kinds of systems that employ SIM. The teachings herein are thus not necessarily limited to imaging of biological samples.

I. Introduction

Structured illumination may produce images that have several times as many resolved illumination sources as with normal illumination. Multiple images with varying angles and phase displacements of structured illumination are used to transform closely spaced, otherwise unresolvable high spatial frequency features, into lower frequency signals that may be sensed by an optical system without violating the Abbe diffraction limit. This limit is physically imposed on imaging by the nature of light and optics and is expressed as a function of emission wavelength and the numerical aperture (NA) of the final objective lens. Applying SIM reconstruction, information from multiple images is transformed from the spatial domain into the Fourier domain, combined and processed, then reconstructed into an enhanced image. The set of lower-resolution source images that are processed in a SIM system and method may be defined as a "SIM stack." The images in each SIM stack may be acquired with an objective lens that is located at a corresponding z-position or distance relative to the imaged subject matter. Several SIM stacks may be acquired of the same subject matter, with each SIM stack having a z-position that differs from the z-position of the other SIM stacks of the same subject matter.

In SIM, a grating is used, or an interference pattern is generated, between the illumination source and the sample, to generate an illumination pattern, such as a pattern that varies in intensity according to a sine or cosine function. In the SIM context, "grating" is sometimes used to refer to the projected structured illumination pattern, in addition to the surface that produces the structured illumination pattern. The structured illumination pattern alternatively may be generated as an interference pattern between parts of a split coherent beam.

Projection of structured illumination onto a sample plane, for example as shown in FIG. 1, mixes the illumination pattern with fluorescent (or reflective) sources in a sample to induce a new signal, sometimes called a Moire fringe or aliasing. The new signal shifts high-spatial frequency information to a lower spatial frequency that may be captured without violating the Abbe diffraction limit.

Figure 1B:
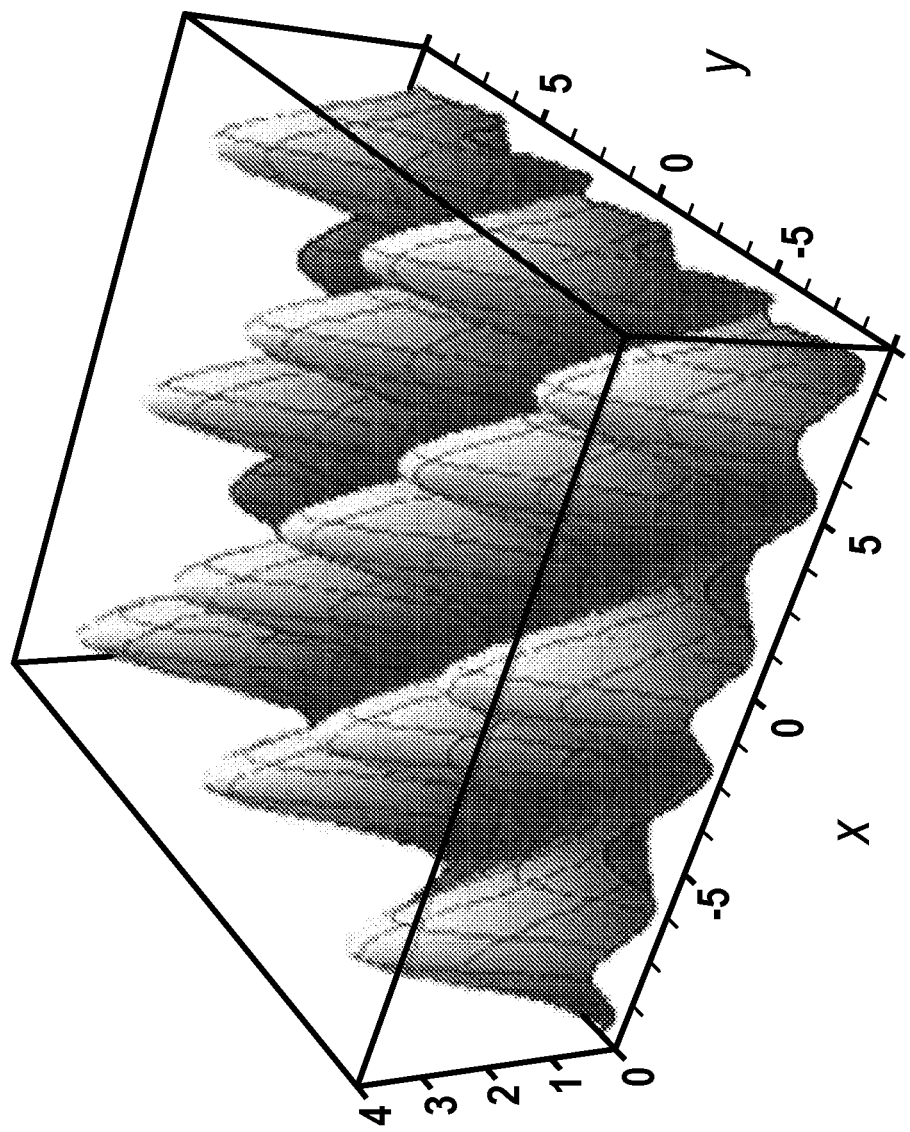
FIG. 1B depicts a graphical illustration of illumination intensities produced by a two-dimensional (2D) structured illumination pattern.

After capturing images of a sample illuminated with a 1D intensity modulation pattern, as shown in FIG. 1A, or 2D intensity modulation pattern, as shown in FIG. 1B, a linear system of equations is solved and used to extract, from multiple images of the Moire fringe or aliasing, parts of the new signal that contains information shifted from the higher to the lower spatial frequency.

To solve the linear equations, several images are captured with the structured illumination pattern shifted or displaced in steps. Images of varying phases per angle may be captured for analysis and then separated by bands for Fourier domain shifting and recombination. Increasing the number of images may improve the quality of reconstructed images by boosting the signal-to-noise ratio. However, it may also increase computation time. The Fourier representation of the band separated images is shifted and summed to produce a reconstructed sum. Eventually, an inverse Fast Fourier Transform (FFT) reconstructs a new high-resolution image from the reconstructed sum.

The standard algorithms for 1D modulated illumination may involve modification when used with a 2D modulated illumination pattern. This may include illumination peak spacing and illumination peak angle estimation, which may involve a 2D band separation. The modification may also include Wicker phase estimation, which work from two points (instead of one) in order to estimate the phase in two dimensions. A 1D interference pattern may be generated by one dimensional diffraction grating as shown in FIG. 1A or as a result of an interference pattern of two beams. In some instances, during imaging of the sample, three images of fringe patterns of the sample are acquired at various pattern phases (e.g., 0°, 120°, and 240°), so that each location on the sample is exposed to a range of illumination intensities, with the procedure repeated by rotating the pattern orientation about the optical axis to 2 (e.g., 45°, 135°) or 3 (e.g., 0°, 60° and 120°) separate angles.

FIG. 1B illustrates an intensity distribution that may be produced by a 2D diffraction grating or by interference of two pairs of coherent light beams. In particular, a 2D structured illumination may be formed by two orthogonal 1D diffraction gratings superimposed upon one another. As in the case of 1D structured illumination patterns, the 2D illumination patterns may be generated either by use of 2D diffraction gratings or by interference between two pairs of coherent light beams that creates a regularly repeating fringe pattern. Two light beams produce an intensity pattern (horizontal bright and dark lines) along y-axis and are therefore referred to as the y-pair of incident beams. Two more light beams produce an intensity pattern (vertical bright and dark lines) along x-axis and are referred to as the x-pair of incident beams. The interference of the y-pair with the x-pair of light beams produces a 2D illumination pattern. FIG. 1B shows intensity distribution of such a 2D illumination pattern.

Figure 1C:
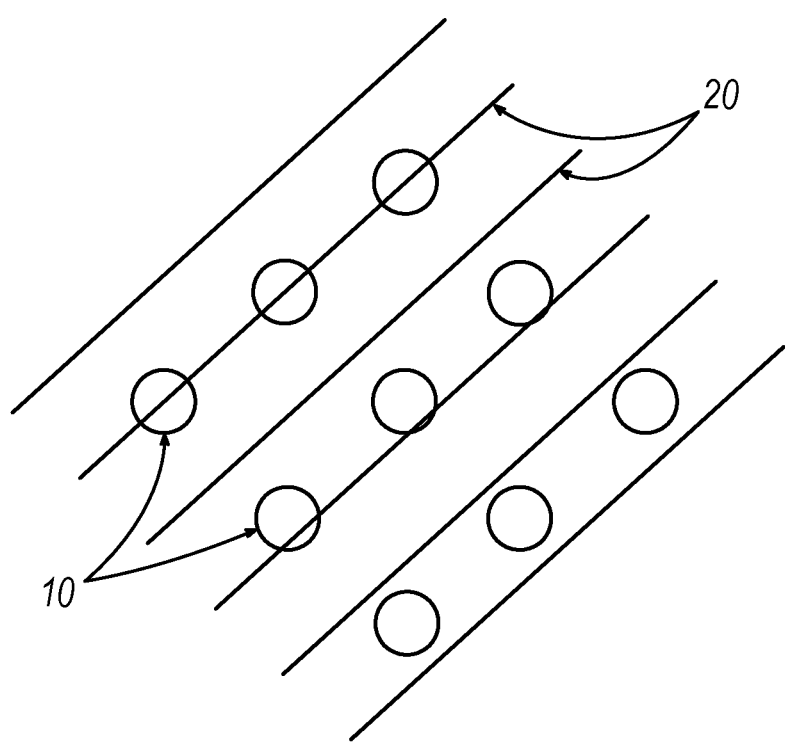
FIG. 1C depicts an example of a geometrical pattern for a nanowell arrangement.

FIG. 1C illustrates an arrangement of nanowells 10 at the surface of a flow cell positioned at corners of a rectangle. FIG. 1C also shows lines 20 of a structured illumination fringe pattern projected onto nanowells 10. In the example shown, lines 20 are slightly angularly offset relative to the alignment of nanowells 10, such that lines 20 are neither perfectly aligned with (or parallel to) the rows of nanowells 10 or the columns of nanowells 10. Alternatively, lines 20 may have any other suitable spatial relationship with the alignment of columns or rows of nanowells 10; or with other spatial arrangements of nanowells 10. When using 1D structured illumination, the illumination peak angle is selected such that images are taken along a line connecting diagonally opposed corners of the rectangle. For example, two sets of three images (a total of six images) may be taken at +45 degree and −45-degree angles. As the distance along the diagonal is more than the distance between any two sides of the rectangle, a higher resolution image is achieved. Nanowells 10 may be arranged in other geometric arrangements such as a hexagon. Three or more images may then be taken along each of three diagonals of the hexagon, resulting, for instance, in nine or fifteen images.

II. Terminology

As used herein to refer to a structured illumination parameter, the term "frequency" is intended to refer to an inverse of spacing between fringes or lines of a structured illumination pattern (e.g., fringe or grid pattern), as frequency and period are inversely related. For example, a pattern having a greater spacing between fringes will have a lower frequency than a pattern having a lower spacing between fringes.

As used herein to refer to a structured illumination parameter, the term "phase" is intended to refer to a phase of a structured illumination pattern illuminating a sample. For example, a phase may be changed by translating a structured illumination pattern relative to an illuminated sample.

As used herein to refer to a structured illumination parameter, the term "orientation" is intended to refer to a relative orientation between a structured illumination pattern (e.g., fringe or grid pattern) and a sample illuminated by the pattern. For example, an orientation may be changed by rotating a structured illumination pattern relative to an illuminated sample.

As used herein to refer to a structured illumination parameter, the terms "predict" or "predicting" are intended to mean either (i) calculating the value(s) of the parameter without directly measuring the parameter or (ii) estimating the parameter from a captured image corresponding to the parameter. For example, a phase of a structured illumination pattern may be predicted at a time t1 by interpolation between phase values directly measured or estimated (e.g., from captured phase images) at times t2 and t3 where t2<t1<t3. As another example, a frequency of a structured illumination pattern may be predicted at a time t1 by extrapolation from frequency values directly measured or estimated (e.g., from captured phase images) at times t2 and t3 where t2<t3<t1.

As used herein to refer to light diffracted by a diffraction grating, the term "order" or "order number" is intended to mean the number of integer wavelengths that represents the path length difference of light from adjacent slits or structures of the diffraction grating for constructive interference. The interaction of an incident light beam on a repeating series of grating structures or other beam splitting structures may redirect or diffract portions of the light beam into predictable angular directions from the original beam. The term "zeroth order" or "zeroth order maximum" is intended to refer to the central bright fringe emitted by a diffraction grating in which there is no diffraction. The term "first-order" is intended to refer to the two bright fringes diffracted to either side of the zeroth order fringe, where the path length difference is ±1 wavelengths. Higher orders are diffracted into larger angles from the original beam. The properties of the grating may be manipulated to control how much of the beam intensity is directed into various orders. For example, a phase grating may be fabricated to maximize the transmission of the non-zeroth orders and minimize the transmission of the zeroth order beam.

As used herein, the term "optical transfer function" or, in its abbreviated form "OTF," is intended to mean the complex valued transfer function describing an imaging system's response as a function of the spatial frequency. The OTF may be derived from the Fourier transform of the point spread function. In examples described herein, only the amplitude portion of the OTF is important. The amplitude portion of the OTF may be referred to as the "modulation transfer function" or, in its abbreviated form, the "MTF."

As used herein to refer to a sample, the term "feature" is intended to mean a point or area in a pattern that may be distinguished from other points or areas according to relative location. An individual feature may include one or more molecules of a particular type. For example, a feature may include a single target nucleic acid molecule having a particular sequence or a feature may include several nucleic acid molecules having the same sequence (and/or complementary sequence, thereof).

As used herein, the term "xy plane" is intended to mean a 2-dimensional area defined by straight line axes x and y in a Cartesian coordinate system. When used in reference to a detector and an object observed by the detector, the area may be further specified as being orthogonal to the beam axis, or the direction of observation between the detector and object being detected.

As used herein, the term "z coordinate" is intended to mean information that specifies the location of a point, line or area along an axis that is orthogonal to an xy plane in a Cartesian coordinate system. In particular implementations, the z axis is orthogonal to an area of an object that is observed by a detector. For example, the direction of focus for an optical system may be specified along the z axis.

As used herein, the term "optically coupled" is intended to refer to one element being adapted to impart light to another element directly or indirectly.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially," "about," and "approximately" used throughout this Specification are used to describe and account for small fluctuations, such as due to variations in processing. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The term "based on" should be understood to mean that something is determined at least in part by the thing it is indicated as being "based on." To indicate that something must necessarily be completely determined by something else, it is described as being based exclusively on whatever it is completely determined by.

As used herein, the term "nucleotide sequence" or "polynucleotide sequence" should be read to include a polynucleotide molecule, as well as the underlying sequence of the molecule, depending on context. A sequence of a polynucleotide may contain (or encode) information indicative of certain physical characteristics.

III. Examples of Imaging System Components and Arrangements

In some implementations of SIM systems, a linearly polarized light beam is directed through an optical beam splitter that splits the beam into two or more separate orders that may be combined and projected on the imaged sample as an interference fringe pattern with a sinusoidal intensity variation. The split beams are equivalent in power in order to achieve maximum modulation at the sample plane. Diffraction gratings are examples of beam splitters that may generate beams with a high degree of coherence and stable propagation angles. When two such beams are combined, the interference between them may create a uniform, regularly-repeating fringe pattern where the spacing is determined by factors including the angle between the interfering beams. The relationship between the fringe periodicity (FP), the incidence angle ($\theta$) and the wavelength of light ($\lambda$) may be expressed in the following equation (I):

$$FP = \lambda \div 2 \sin(\theta), \qquad (I)$$

where the fringe period (FP) and the wavelength of light ($\lambda$) are in the same units (e.g., nm) and $\theta$ is the incidence angle with respect to the surface normal expressed in radians.

FIGS. 2-4B illustrate examples of different forms that SIM imaging systems may take. It should be noted that while these systems are described primarily in the context of SIM imaging systems that generate 1D illumination patterns, the technology disclosed herein may be implemented with SIM imaging systems that generate higher dimensional illumination patterns (e.g., two-dimensional grid patterns).

Figure 2:
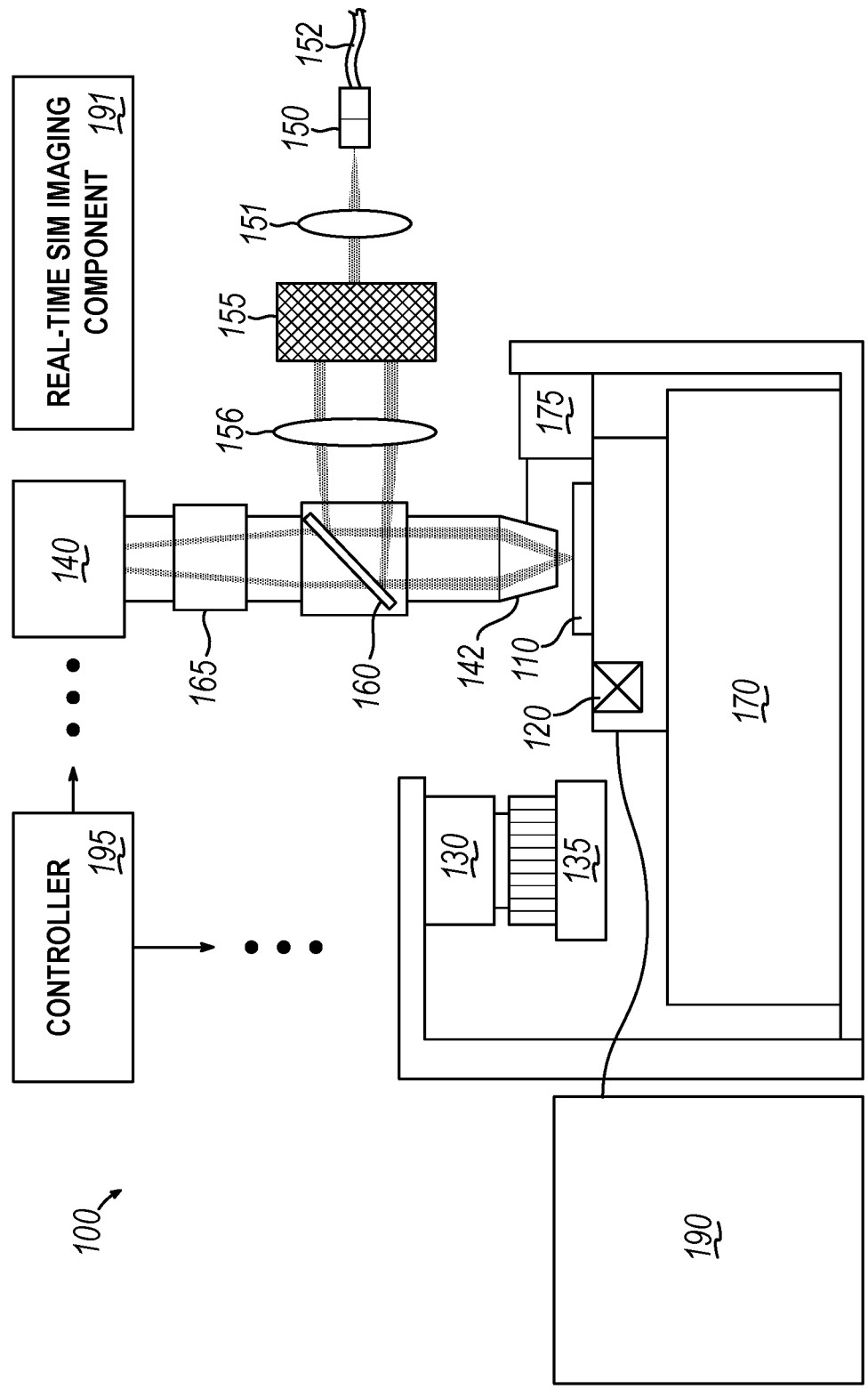
FIG. 2 depicts a schematic diagram of a SIM biological sample imaging system that may utilize spatially structured excitation light to image a sample.

FIG. 2 illustrates a SIM imaging system 100 that may implement structured illumination parameter prediction in accordance with some implementations described herein. For example, system 100 may be a structured illumination fluorescence microscopy system that utilizes spatially structured excitation light to image a biological sample.

In the example of FIG. 2, a light emitter 150 is configured to output a light beam that is collimated by collimation lens 151. The collimated light is structured (patterned) by light structuring optical assembly 155 and directed by dichroic mirror 160 through objective lens 142 onto a sample of a sample container 110, which is positioned on a motion stage 170. In the case of a fluorescent sample, the sample fluoresces in response to the structured excitation light, and the resultant light is collected by objective lens 142 and directed to an image sensor of camera system 140 to detect fluorescence.

Light structuring optical assembly 155 includes one or more optical diffraction gratings or other beam splitting elements (e.g., a beam splitter cube or plate) to generate a pattern of light (e.g., fringes, typically sinusoidal) that is projected onto samples of a sample container 110. The diffraction gratings may be one-dimensional or two-dimensional transmissive or reflective gratings. The diffraction gratings may be sinusoidal amplitude gratings or sinusoidal phase gratings. In some versions, light structuring optical assembly 155 includes a pair of phase masks, where each phase mask includes a piece of glass with graduations etched into the glass.

In some implementations, the diffraction grating(s)s may not utilize a rotation stage to change an orientation of a structured illumination pattern. In other implementations, the diffraction grating(s) may be mounted on a rotation stage. In some implementations, the diffraction gratings may be fixed during operation of the imaging system (i.e., not require rotational or linear motion). For example, in a particular implementation, further described below, the diffraction gratings may include two fixed one-dimensional transmissive diffraction gratings oriented perpendicular to each other (e.g., a horizontal diffraction grating and vertical diffraction grating).

As illustrated in the example of FIG. 2, light structuring optical assembly 155 outputs the first orders of the diffracted light beams while blocking or minimizing all other orders, including the zeroth orders. However, in alternative implementations, additional orders of light may be projected onto the sample.

During each imaging cycle, imaging system 100 utilizes light structuring optical assembly 155 to acquire a plurality of images at various phases, with the fringe pattern displaced laterally in the modulation direction (e.g., in the x-y plane and perpendicular to the fringes), with this procedure repeated one or more times by rotating the pattern orientation about the optical axis (i.e., with respect to the x-y plane of the sample). The captured images may then be computationally reconstructed to generate a higher resolution image (e.g., an image having about twice the lateral spatial resolution of individual images).

In system 100, light emitter 150 may be an incoherent light emitter (e.g., emit light beams output by one or more excitation diodes), or a coherent light emitter such as emitter of light output by one or more lasers or laser diodes. As illustrated in the example of system 100, light emitter 150 includes an optical fiber 152 for guiding an optical beam to be output. However, other configurations of a light emitter 150 may be used. In implementations utilizing structured illumination in a multi-channel imaging system (e.g., a multi-channel fluorescence microscope utilizing multiple wavelengths of light), optical fiber 152 may optically couple to a plurality of different light sources (not shown), each light source emitting light of a different wavelength. Although system 100 is illustrated as having a single light emitter 150, in some implementations multiple light emitters 150 may be included. For example, multiple light emitters may be included in the case of a structured illumination imaging system that utilizes multiple arms, further discussed below.

In some implementations, system 100 may include a projection lens 156 that may include a lens element to articulate along the z-axis to adjust the structured beam shape and path. For example, a component of the projection lens 156 may be articulated to account for a range of sample thicknesses (e.g., different cover glass thickness) of the sample in container 110.

In the example of system 100, fluid delivery module or device 190 may direct the flow of reagents (e.g., fluorescently labeled nucleotides, buffers, enzymes, cleavage reagents, etc.) to (and through) sample container 110 and waste valve 120. Sample container 110 may include one or more substrates upon which the samples are provided. For example, in the case of a system to analyze a large number of different nucleic acid sequences, sample container 110 may include one or more substrates on which nucleic acids to be sequenced are bound, attached or associated. The substrate may include any inert substrate or matrix to which nucleic acids may be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or array across the sample container 110. System 100 may also include a temperature station actuator 130 and heater/cooler 135 that may optionally regulate the temperature of conditions of the fluids within the sample container 110.

In particular implementations, the sample container 110 may be implemented as a patterned flow cell including a transparent cover plate, a substrate, and a liquid contained therebetween, and a biological sample may be located at an inside surface of the transparent cover plate or an inside surface of the substrate. The flow cell may include a large number (e.g., thousands, millions, or billions) of wells (also referred to as nanowells) or regions that are patterned into a defined array (e.g., a hexagonal array, rectangular array, etc.) into the substrate. Each region may form a cluster (e.g., a monoclonal cluster) of a biological sample such as DNA, RNA, or another genomic material which may be sequenced, for example, using sequencing by synthesis. The flow cell may be further divided into a number of spaced apart lanes (e.g., eight lanes), each lane including a hexagonal array of clusters.

Sample container 110 may be mounted on a sample stage 170 to provide movement and alignment of the sample container 110 relative to the objective lens 142. The sample stage may have one or more actuators to allow it to move in any of three dimensions. For example, in terms of the Cartesian coordinate system, actuators may be provided to allow the stage to move in the x, y, and z directions relative to the objective lens. This may allow one or more sample locations on sample container 110 to be positioned in optical alignment with objective lens 142. Movement of sample stage 170 relative to objective lens 142 may be achieved by moving the sample stage itself, the objective lens, some other component of the imaging system, or any combination of the foregoing. Further implementations may also include moving the entire imaging system over a stationary sample. Alternatively, sample container 110 may be fixed during imaging.

In some implementations, a focus (z-axis) component 175 may be included to control positioning of the optical components relative to the sample container 110 in the focus direction (typically referred to as the z axis, or z direction). Focus component 175 may include one or more actuators physically coupled to the optical stage or the sample stage, or both, to move sample container 110 on sample stage 170 relative to the optical components (e.g., the objective lens 142) to provide proper focusing for the imaging operation. For example, the actuator may be physically coupled to the respective stage such as, for example, by mechanical, magnetic, fluidic or other attachment or contact directly or indirectly to or with the stage. The one or more actuators may be configured to move the stage in the z-direction while maintaining the sample stage in the same plane (e.g., maintaining a level or horizontal attitude, perpendicular to the optical axis). The one or more actuators may also be configured to tilt the stage. This may be done, for example, so that sample container 110 may be leveled dynamically to account for any slope in its surfaces.

The structured light emanating from a test sample at a sample location being imaged may be directed through dichroic mirror 160 to one or more detectors of camera system 140. In some implementations, a filter switching assembly 165 with one or more emission filters may be included, where the one or more emission filters may be used to pass through particular emission wavelengths and block (or reflect) other emission wavelengths. For example, the one or more emission filters may be used to switch between different channels of the imaging system. In a particular implementation, the emission filters may be implemented as dichroic mirrors that direct emission light of different wavelengths to different image sensors of camera system 140.

Camera system 140 may include one or more image sensors to monitor and track the imaging (e.g., sequencing) of sample container 110. Camera system 140 may be implemented, for example, as a charge-coupled device (CCD) image sensor camera, but other image sensor technologies (e.g., active pixel sensor) may be used. While camera system 140 and associated optical components are shown as being positioned above sample container 110 in FIG. 2, one or more image sensors or other camera components may be incorporated into system 100 in numerous other ways as will be apparent to those skilled in the art in view of the teachings herein. For instance, one or more image sensors may be positioned under sample container 110 or may even be integrated into sample container 110.

Output data (e.g., images) from camera system 140 may be communicated to a real-time SIM imaging component 191 that may be implemented as a software application that, as further described below, may reconstruct the images captured during each imaging cycle to create an image having a higher spatial resolution. The reconstructed images may take into account changes in structure illumination parameters that are predicted over time. In addition, SIM imaging component 191 may be used to track predicted SIM parameters and/or make predictions of SIM parameters given prior estimated and/or predicted SIM parameters.

A controller 195 may be provided to control the operation of structured illumination imaging system 100, including synchronizing the various optical components of system 100. The controller may be implemented to control aspects of system operation such as, for example, configuration of light structuring optical assembly 155 (e.g., selection and/or linear translation of diffraction gratings), movement of projection lens 156, activation of focus component 175, stage movement, and imaging operations. The controller may be also be implemented to control hardware elements of the system 100 to correct for changes in structured illumination parameters over time. For example, the controller may be configured to transmit control signals to motors or other devices controlling a configuration of light structuring optical assembly 155, motion stage 170, or some other element of system 100 to correct or compensate for changes in structured illumination phase, frequency, and/or orientation over time. In implementations, these signals may be transmitted in accordance with structured illumination parameters predicted using SIM imaging component 191. In some implementations, controller 195 may include a memory for storing predicted and or estimated structured illumination parameters corresponding to different times and/or sample positions.

In various implementations, the controller 195 may be implemented using hardware, algorithms (e.g., machine executable instructions), or a combination of the foregoing. For example, in some implementations the controller may include one or more CPUs, GPUs, or processors with associated memory. As another example, the controller may comprise hardware or other circuitry to control the operation, such as a computer processor and a non-transitory computer readable medium with machine-readable instructions stored thereon. For example, this circuitry may include one or more of the following: field programmable gate array (FPGA), application specific integrated circuit (ASIC), programmable logic device (PLD), complex programmable logic device (CPLD), a programmable logic array (PLA), programmable array logic (PAL) and other similar processing device or circuitry. As yet another example, the controller may comprise a combination of this circuitry with one or more processors.

Figure 3:
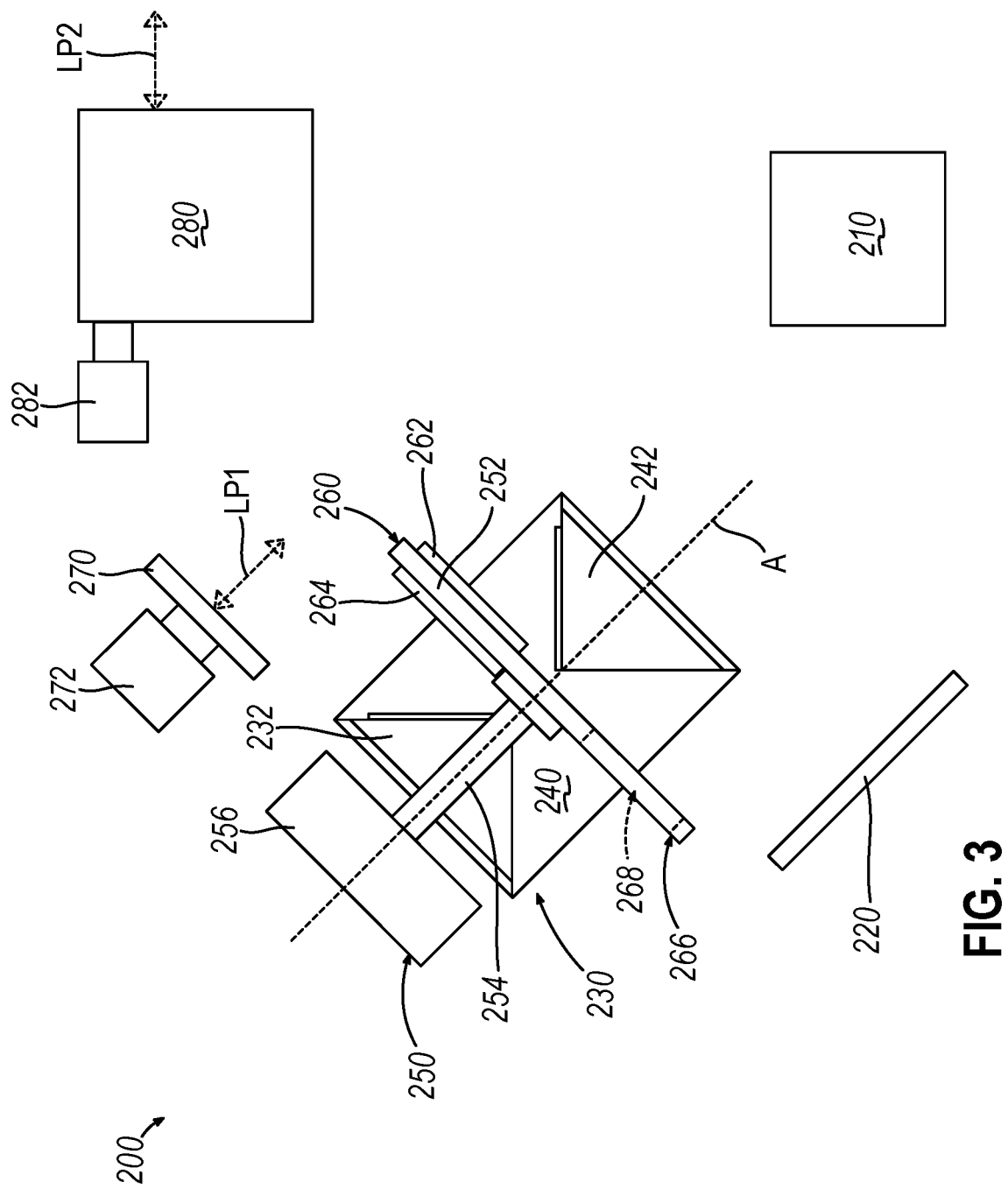
FIG. 3 depicts a schematic diagram of an example of an alternative optical assembly for use in the SIM biological sample imaging system of FIG. 2.

FIG. 3 shows an example of an alternative optical assembly 200 that may be incorporated into system (e.g., in place of optical assembly 155). Optical assembly 200 of this example includes a light emitting assembly 210, a fixed reflecting element 220, a phase mask assembly 230, a grating switcher 250, an adjustable reflecting element 270, and a projection lens assembly 280. Light emitting assembly 210 may include various components, including but not limited to a source of coherent light (e.g., at least one laser, etc.) and a pair of anamorphic prisms, a source of incoherent light and a collimator, or any other suitable components as will be apparent to those skilled in the art in view of the teachings herein. In some versions light emitting assembly 210 is operable to emit light via two or more separate channels (e.g., a blue channel and a green channel). In versions where light is emitted in two or more separate channels, system 100 may include two or more corresponding image sensors, such that each image sensor is dedicated to a corresponding image sensor. Also, in some versions, light emitting assembly 210 is operable to emit light in pulses at a predetermined frequency (e.g., using a high-speed shutter, etc.).

Reflecting element 220 of the present example includes a mirror whose position is fixed relative to the other components of optical assembly 200. As described in greater detail below, reflecting element 220 is positioned and configured to reflect light emitted from light emitting assembly 210 toward phase mask assembly 230 and grating switcher 250 during operation of optical assembly 200.

Figure 4:
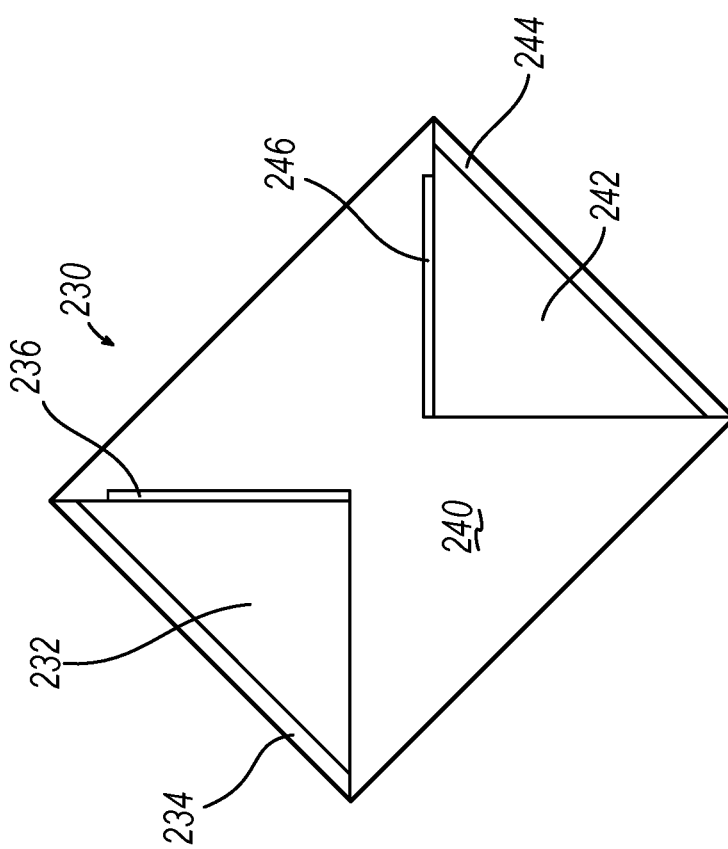
FIG. 4 depicts a schematic diagram of a phase mask assembly of the optical assembly of FIG. 3.

As best seen in FIG. 4, phase mask assembly 230 of the present example includes a pair of triangular glass elements 232, 242 fixedly mounted to a base 240. Each glass element 232, 242 includes a reflector 234, 244 along one side of the glass element 232, 242. Each glass element 232, 242 also includes a phase mask 236, 246 along another side of the glass element 232, 242. In the present example, each phase mask 236, 246 includes graduations (e.g., parallel slits or grooves, etc.) forming a grating or fringe pattern etched into the glass of glass element 232, 242. The graduation spacing may be chosen to diffract light at suitable angles and tuned to the minimum resolvable feature size of the imaged samples for operation of system 100. As will be described in greater detail below, these phase masks 236, 246 are configured to produce Moire fringe or aliasing during operation of optical assembly 200. While phase masks 236, 246 are formed by etched graduations in the glass of glass elements 232, 242 in the present example, other suitable ways in which phase masks 236, 246 may be formed will be apparent to those skilled in the art in view of the teachings herein. During operation of optical assembly 200, the entire phase mask assembly 230 remains stationary relative to the other components of optical assembly 200.

To improve efficiency of the system, the zeroth order beams and all other higher order diffraction beams output by each phase mask 236, 246 may be blocked (i.e., filtered out of the illumination pattern projected on the sample 110). For example, a beam blocking element (not shown) such as an order filter may be inserted into the optical after path phase mask assembly 230. In some implementations, diffraction gratings phase masks 236, 246 may configured to diffract the beams into only the first orders and the zeroth order (undiffracted beam) may be blocked by some beam blocking element.

As shown in FIG. 3, grating switcher 250 of the present example includes a plate 252 mounted to a shaft 254. Shaft 254 is further coupled with a motor 256 that is operable to rotate shaft 254 and plate 252 about an axis A. One end 260 of plate 252 includes a pair of mirrors 262, 264 with each mirror 262, 264 being mounted to an opposite side of plate 252. The other end 266 of plate 252 defines an opening 268 that allows light to pass through as described below. In some versions, motor 256 is a stepper motor. Alternatively, motor 256 may take any other suitable form; and motor 256 may be substituted with any other suitable source of rotary motion. As shown in FIGS. 5A-5D and as will be described in greater detail below, motor 256 may be activated to transition grating switcher 250 between a first state (FIGS. 5A-5B) and a second state (FIGS. 5C-5D) by rotating shaft 254 and plate 252 about the axis A. When grating switcher 250 is in the first state, grating switcher 250 and phase mask assembly 230 may provide a first grating angle. When grating switcher 250 is in the second state, grating switcher 250 and phase mask assembly 230 may provide a second grating angle.

As also shown in FIG. 3, adjustable reflecting element 270 of the present example includes a mirror that is coupled with an actuator 272, such that the actuator 272 is operable to drive reflecting element 270 along a linear path LP1. In this example, linear path LP1 is parallel with axis A. In some versions, actuator 272 includes a piezoelectric element. As another example, actuator 272 may include a solenoid. In some other versions, actuator 272 includes a stepper motor or other rotary drive source that is coupled with a mechanical assembly (e.g., rack and pinion or worm gear and nut, etc.) that is operable to convert rotary motion into linear motion. As described in greater detail below, with actuator 272 changing the position of reflecting element 270 along linear path LP1, actuator 272 and reflecting element 270 are together operable to provide phase modulation to light that is transmitted through optical assembly 200. In other words, actuator 272 and reflecting element 270 may together provide a phase adjustment assembly.

By way of example, actuator 272 may be operable to drive reflecting element 270 through a range of motion of approximately 5 µm during operation of actuator 272, which may provide fringe movement of approximately 240 degrees, as described in greater detail below. Alternatively, actuator 272 may be operable to drive reflecting element 270 through a range of motion ranging from approximately 2 µm to approximately 10 µm during operation of actuator 272. As described in greater detail below, actuator 272 may be driven to arrest motion of reflecting element at two, three, or more different positions through the range of motion along the linear path.

Projection lens assembly 280 may include one or more lens elements (e.g., a tube lens) and various other components as will be apparent to those skilled in the art in view of the teachings herein. Light passed through projection lens assembly 280 may eventually reach sample container 110 (e.g., a flow cell, etc.). In some instances, this may cause biological material in the sample container 110 to fluoresce, with such fluorescence being picked up by an image sensor (e.g., an image sensor of camera system 140) to enable analysis of the biological material. Projection lens assembly 280 of the present example is coupled with an actuator 282, which is operable to drive at least a portion of projection lens assembly 280 along a linear path LP2. In some versions, actuator 282 includes a piezoelectric element. As another example, actuator 282 may include a solenoid. In some other versions, actuator 282 includes a stepper motor or other rotary drive source that is coupled with a mechanical assembly (e.g., rack and pinion or worm gear and nut, etc.) that is operable to convert rotary motion into linear motion. As described in greater detail below, with actuator 282 changing the position of at least a portion of projection lens assembly 280 along linear path LP2, actuator 282 and projection lens assembly 280 are together operable to provide adjustment of the SIM grating focal plane.

As noted above, system 100 of the present example includes a controller 195. Controller 195 may be used to control the operation of optical assembly 200 and other features of system 100, including synchronizing the various components of optical assembly 200 and system 100. The controller 195 may be implemented to control aspects of system operation such as, for example, activation of motor 256, activation of actuator 272, movement of one or more elements of projection lens assembly 280 via actuator 282, activation of focus component 175, activation of camera system 140, and other imaging operations. The controller may be also be implemented to control hardware elements of the system 100 to correct for changes in structured illumination parameters over time. For example, the controller may be configured to transmit control signals to devices (e.g., motor 256, actuator 272, etc.) to correct or compensate for changes in structured illumination phase, frequency, and/or orientation over time. In implementations, these signals may be transmitted in accordance with structured illumination parameters predicted using a SIM imaging component. In some implementations, the controller may include a memory for storing predicted and or estimated structured illumination parameters corresponding to different times and/or sample positions.

FIGS. 5A-5D show optical assembly 200 at various stages of operation. At the stage shown in FIG. 5A, light emitting assembly 210 emits light toward reflecting element 220, which reflects the light toward phase mask assembly 230 and grating switcher 250. At this stage, grating switcher 250 is in a first state such that the light reflected from reflecting element 220 is further reflected by mirror 262. The light reflected by mirror 262 passes through glass element 242 and reaches reflector 244, which reflects the light toward phase mask 246. As the light passes through phase mask 246, phase mask 246 provides a patterned form to the light. This patterned or structured light then passes through opening 268 of plate 252 and reaches reflecting element 270, which then reflects the structured light toward projection lens assembly 280. After passing through projection lens assembly 280, the structured light reaches the object targeted for imaging (e.g., the sample container 110); and camera system 140 captures a first image of the targeted object.

Figure 5A:
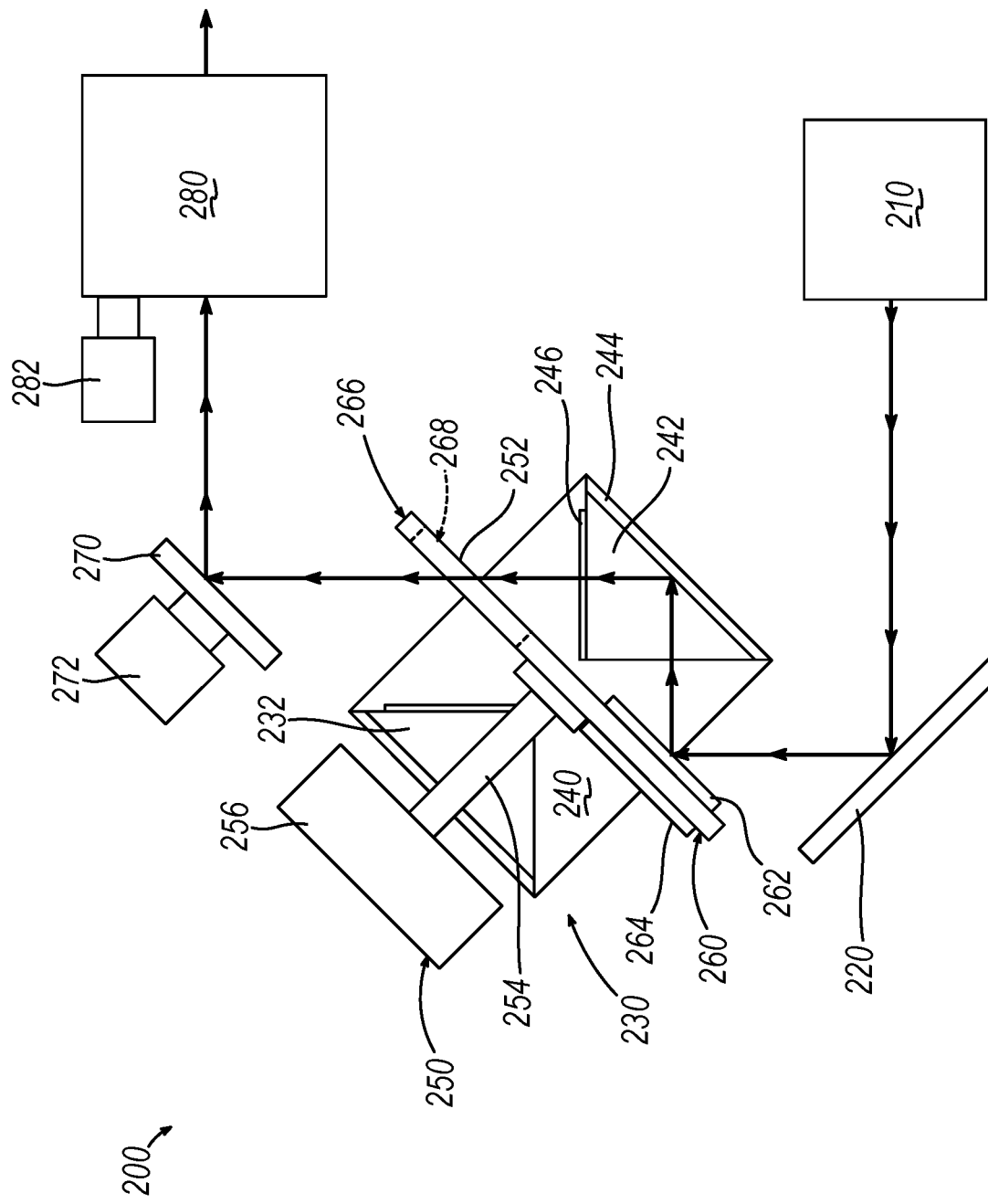
FIG. 5A depicts a schematic diagram of the optical assembly of FIG. 3 with a grating switcher in a first state and an adjustable reflecting element in a first state.
Figure 5B:
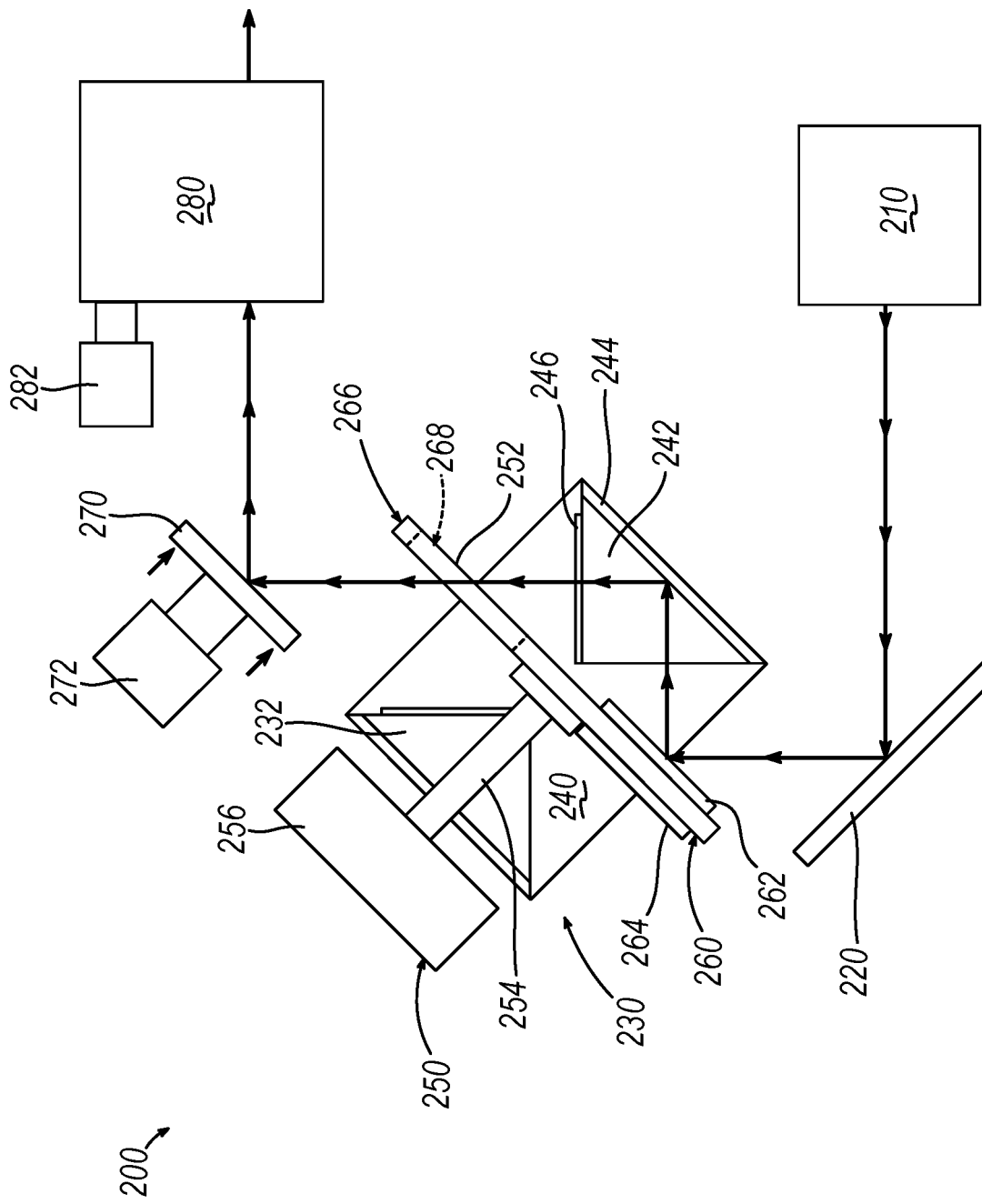
FIG. 5B depicts a schematic diagram of the optical assembly of FIG. 3 with the grating switcher in the first state and the adjustable reflecting element in a second state.

After the first image is acquired with the configuration of optical system 200 shown in FIG. 5A, actuator 272 is activated to drive reflecting element 270 from a first position on the linear path LP1 to a second position on the linear path LP1, such that optical system 200 is then in the configuration shown in FIG. 5B. At the stage shown in FIG. 5B, light emitting assembly 210 emits light toward reflecting element 220, which reflects the light toward phase mask assembly 230 and grating switcher 250. At this stage, grating switcher 250 is in a first state such that the light reflected from reflecting element 220 is further reflected by mirror 262. The light reflected by mirror 262 passes through glass element 242 and reaches reflector 244, which reflects the light toward phase mask 246. As the light passes through phase mask 246, phase mask 246 provides a patterned form to the light. This patterned or structured light then passes through opening 268 of plate 252 and reaches reflecting element 270, which then reflects the structured light toward projection lens assembly 280. After passing through projection lens assembly 280, the structured light reaches the object targeted for imaging (e.g., the sample container 110); and camera system 140 captures another image of the targeted object.

The only difference between the stage shown in FIG. 5A and the stage shown in FIG. 5B is that reflecting element 270 is in a second state (i.e., at a second position along the linear path LP1). Thus, because reflecting element 270 is at a different position during this stage of operation, the image captured with optical assembly 200 in the configuration shown in FIG. 5B will have a different phase than the image captured with optical assembly 200 in the configuration shown in FIG. 5A.

In some versions of the process described herein, actuator 272 is activated to drive reflecting element 270 to a third position along linear path LP1 while grating switcher 250 is in the first state, before proceeding to the stage shown in FIG. 5C and described below. In such versions of the process, camera system 140 may capture three images while grating switcher 250 is in the first state, with each of these images representing a different phase based on the respective positions of reflecting element 270 along the linear path LP1. Of course, actuator 272 may also be activated to drive reflecting member 270 to a fourth position, fifth position, etc., such that any desired number of phases may be employed during the capture of images while grating switcher 250 is in the first state.

Figure 5C:
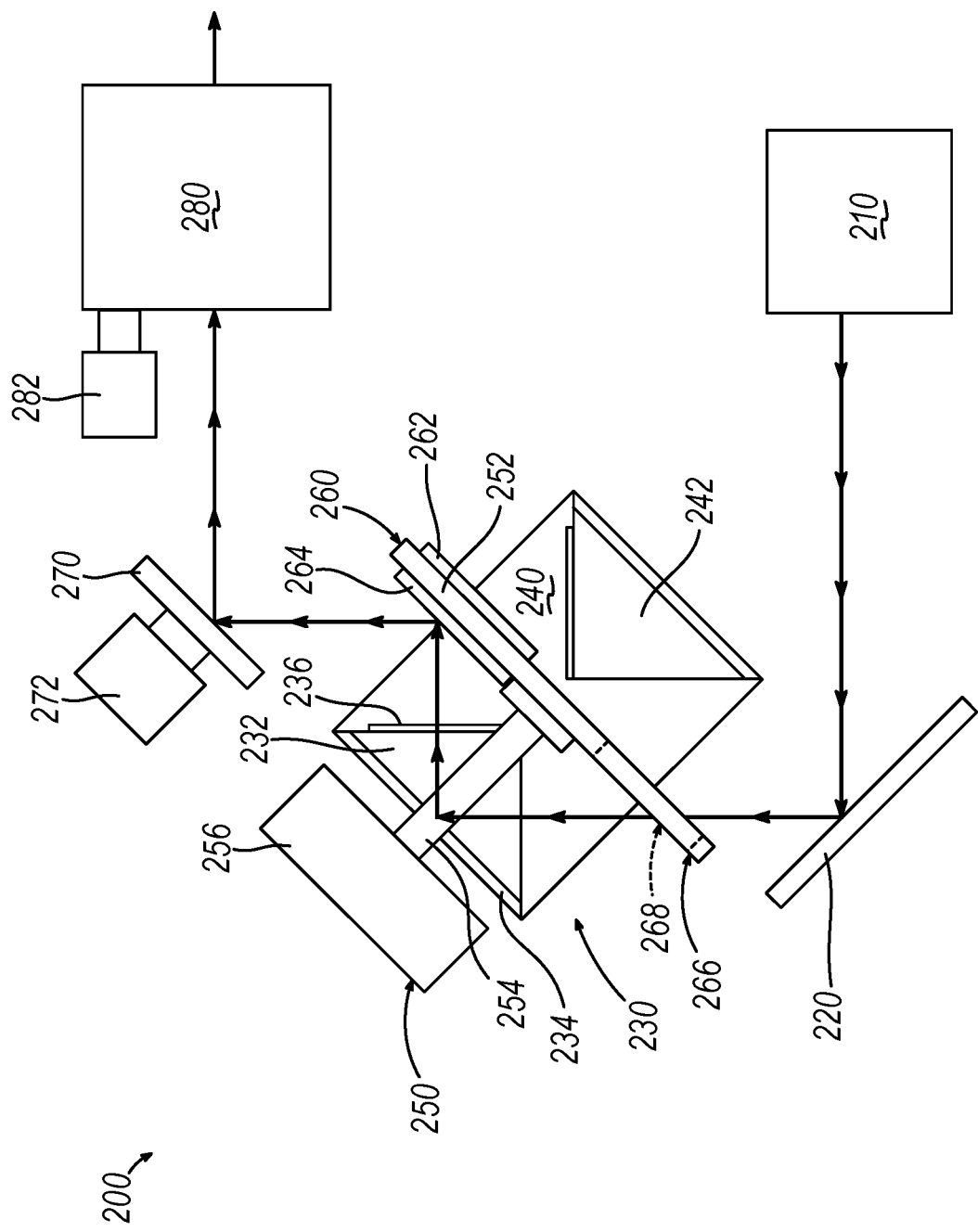
FIG. 5C a schematic diagram of the optical assembly of FIG. 3 with the grating switcher in a second state and the adjustable reflecting element in the first state.
Figure 5D:
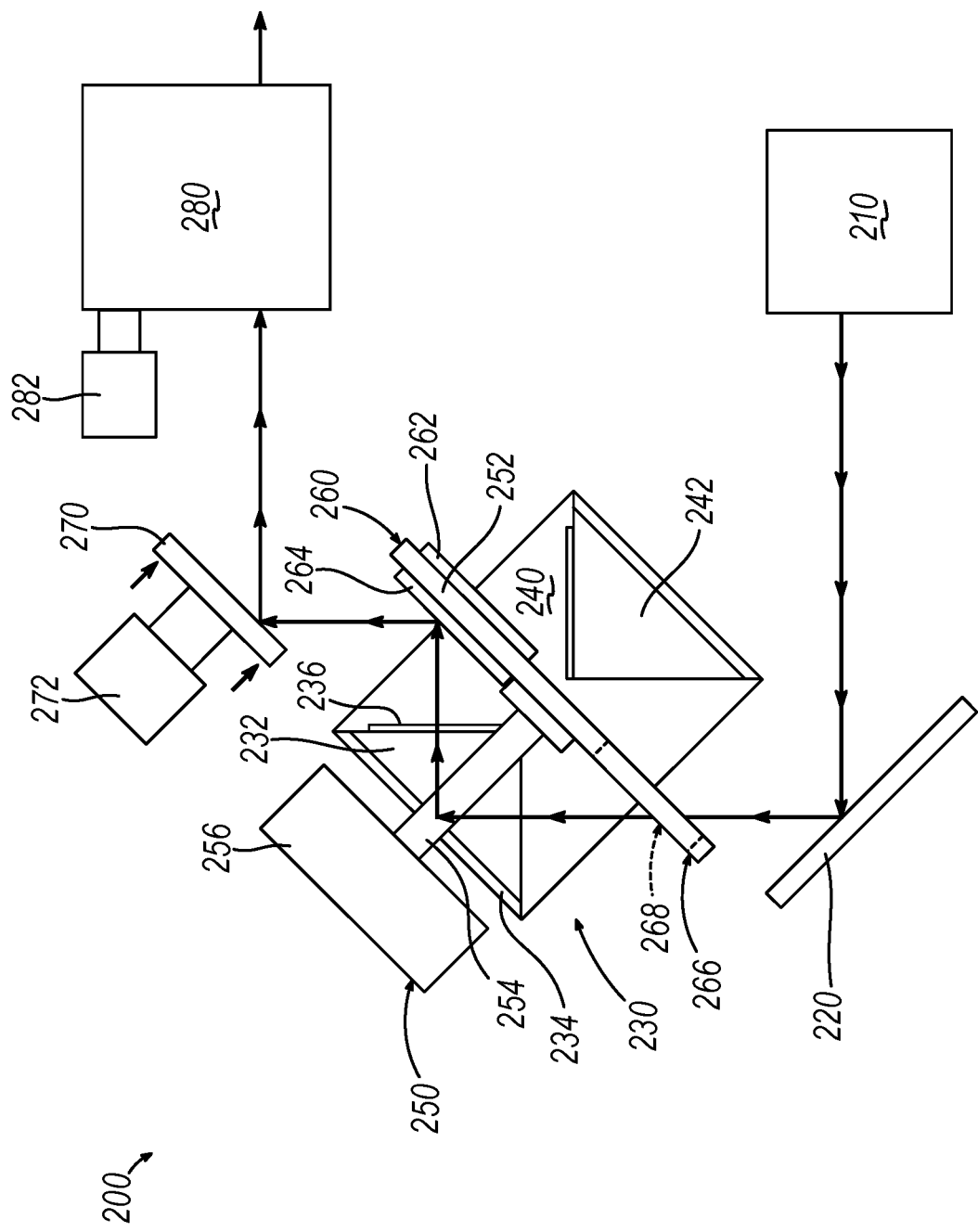
FIG. 5D a schematic diagram of the optical assembly of FIG. 3 with the grating switcher in the second state and the adjustable reflecting element in the second state.

After the desired number of images have been acquired with grating switcher 250 in the first state shown in FIGS. 5A-5B, motor 256 is activated to rotate shaft 254 about the axis A, thereby rotating plate 252 about the axis A, to transition grating switcher 250 to the second state shown in FIGS. 5C-5D. At the stage shown in FIG. 5C. actuator 272 has also been activated to return reflecting element 270 from the second state (i.e., the second position on the linear path LP1) back to the first state (i.e., the first position on the linear path LP1). In some other versions, reflecting element 270 remains in the second state immediately following the transition of grating switcher 250 from the first state to the second state; and reflecting element 270 is transitioned to the first state after an image has been captured while reflecting element 270 is in the second state and grating switcher 250 is in the second state.

At the stage shown in FIG. 5C, light emitting assembly 210 emits light toward reflecting element 220, which reflects the light toward phase mask assembly 230 and grating switcher 250. With grating switcher 250 now in the second state, the light reflected from reflecting element 220 passes through opening 268 and passes further through glass element 232. The light passed through glass element 232 reaches reflector 234, which reflects the light toward phase mask 236. As the light passes through phase mask 236, phase mask 236 provides a patterned form to the light. This patterned or structured light is then reflected off of mirror 264. Mirror 264 reflects the structured light toward reflecting element 270, which then reflects the structured light toward projection lens assembly 280. After passing through projection lens assembly 280, the structured light reaches the object targeted for imaging (e.g., the sample container 110); and camera system 140 captures another image of the targeted object.

After the image is acquired with the configuration of optical system 200 shown in FIG. 5C, actuator 272 is activated to drive reflecting element 270 from the first state (i.e., the first position on the linear path LP1) to the second state (i.e., the second position on the linear path LP1), such that optical system 200 is then in the configuration shown in FIG. 5D. At the stage shown in FIG. 5D, light emitting assembly 210 emits light toward reflecting element 220, which reflects the light toward phase mask assembly 230 and grating switcher 250. With grating switcher 250 now in the second state, the light reflected from reflecting element 220 passes through opening 268 and passes further through glass element 232. The light passed through glass element 232 reaches reflector 234, which reflects the light toward phase mask 236. As the light passes through phase mask 236, phase mask 236 provides a patterned form to the light. This patterned or structured light is then reflected off of mirror 264. Mirror 264 reflects the structured light toward reflecting element 270, which then reflects the structured light toward projection lens assembly 280. After passing through projection lens assembly 280, the structured light reaches the object targeted for imaging (e.g., the sample container 110); and camera system 140 captures another image of the targeted object.

The only difference between the stage shown in FIG. 5C and the stage shown in FIG. 5D is that reflecting element 270 is in the second state (i.e., at the second position along the linear path LP1). Thus, because reflecting element 270 is at a different position during this stage of operation, the image captured with optical assembly 200 in the configuration shown in FIG. 5D will have a different phase than the image captured with optical assembly 200 in the configuration shown in FIG. 5C.

In some versions of the process described herein, actuator 272 is activated to drive reflecting element 270 to a third position along linear path LP1 while grating switcher 250 is in the second state, before completing the process of capturing images. In such versions of the process, camera system 140 may capture three images while grating switcher 250 is in the second state, with each of these images representing a different phase based on the respective positions of reflecting element 270 along linear path LP1. Of course, actuator 272 may also be activated to drive reflecting member 270 to a fourth position, fifth position, etc., such that any desired number of phases may be employed during the capture of images while grating switcher 250 is in the second state.

As noted above, the image capture process may be carried out through two or more separate channels (e.g., a blue channel and a green channel). In other words, the process described above with reference to FIGS. 5A-5D may be carried out through two or more separate channels. Light emitting assembly 210 may be operable to provide both channels; or each channel may have its own light emitting assembly 210. In some versions, the two separate channels are activated simultaneously through optical assembly 200. In some other versions, a first channel is activated during the stage shown in FIG. 5A, then a second channel is activated during the stage shown in FIG. 5A, then the first channel is activated during the stage shown in FIG. 5B, then the second channel is activated during the stage shown in FIG. 5B, and so on, until the second channel is activated during the stage shown in FIG. 5D. As yet another example, each channel may have its own dedicated optical assembly 200. In some such versions, further optical components may be utilized to enable the projection lens assembly 280 of each optical assembly 200 to project the light from each channel to the same target (e.g., sample container 110). Other suitable ways in which one or more optical assemblies 200 may enable use of two or more channels will be apparent to those skilled in the art in view of the teachings herein. It should also be understood that other components within system 100 (e.g., filter switching assembly 165) may further enable use of two or more channels. In versions where one channel is blue and another channel is green, the blue channel may operate with light at a wavelength in the range from approximately 450 nm to approximately 500 nm; and the green channel may operate with light at a wavelength in the range from approximately 500 nm to approximately 570 nm.

As also noted above, the subject matter that is imaged with use of optical assembly 200 in system 100 may include one or more biological samples (e.g., nucleotides, etc.) in nanowells on a flow cell, such that some forms of sample container 110 may include flow cell. Such nanowells may be arranged in a regular repeating pattern. For a rectangular pattern, two structured illumination angles may be used, substantially along two diagonals connecting opposing corners of a rectangle in the pattern, so that intensity peaks of the structured illumination are oriented substantial normal to the two diagonals. Alternatively, the structured illumination angle may be oriented along the same direction as the rectangular nanowell pattern direction (i.e., not along the opposing corners of the rectangle).

For a repeating hexagonal pattern of nanowells, with three diagonals connecting opposing corners of hexagons in the pattern, three structured illumination angles may be used with intensity peaks that are oriented substantial normal to the three diagonals. Alternatively, a two-angle illumination pattern may be used in conjunction with a flow cell having a hexagonal pattern of nanowells, such that it is not necessary in all cases to use three structured illumination angles in conjunction with a hexagonal pattern of nanowells. Moreover, the structured illumination angle may be oriented along the same direction as the hexagonal nanowell pattern direction (i.e., not along the opposing corners of the hexagon).

Regardless of the kind of pattern of nanowells, adjacent nanowells may be positioned closer together than the Abbe diffraction limit of the associated optical system. Alternatively, samples may be randomly distributed over an imaging plane without nanowells. Or, the samples may be regularly arranged over the imaging plane on some structure other than nanowells.

IV. Examples of Image Processing Algorithms

A. Overview of SIM Image Processing Method

An image captured by an optical sensor or image sensor (e.g., as integrated into camera system 140) may be referred to as a tile. Image processing algorithms as described below may subdivide a captured image tile into sub-tiles. Each sub-tile may be evaluated independently. A near-center sub-tile may be handled differently than other sub-tiles. An imaging cycle for a flow cell may capture many image tiles with some overlap. Sub-tiles may be reconstructed independently of one another, even in parallel. Reconstructions from enhanced sub-tiles may be stitched together to create a reconstructed tile with enhanced spatial resolution. In some instances, an image tile is subdivided into sub-tiles such that the peak lines are approximately evenly spaced within a sub-tile, thereby achieving better image quality from reconstructed sub-tiles across a field of view of a lens.

In some instances, at least three parameters are mapped for each sub-tile. Such parameters may include illumination peak angle, illumination peak spacing, and phase displacement. The illumination peak angle may also be referred to as grating angle. The illumination peak spacing may also be referred to as grating spacing. In other words, the illumination peak spacing defines the periodicity of the grating (e.g., the spacing between parallel lines defined by phase masks 236, 246). The phase displacement or the phase is the shift of the structured illumination pattern or grating as projected onto the sample plane (e.g., based on the position of reflecting element 270 along the linear path LP1, as driven by actuator 272). In other words, the phase may be defined as the distance from a common reference point to the start of the repeating illumination pattern in the direction orthogonal to the grating. The phase may be expressed in radians or degrees; and may be regarded as a fraction of the repeating pattern periodicity. The phase displacement may also be referred to as the grating phase. The angle and spacing may be mapped using quadratic surface distortion models.

Figure 8A:
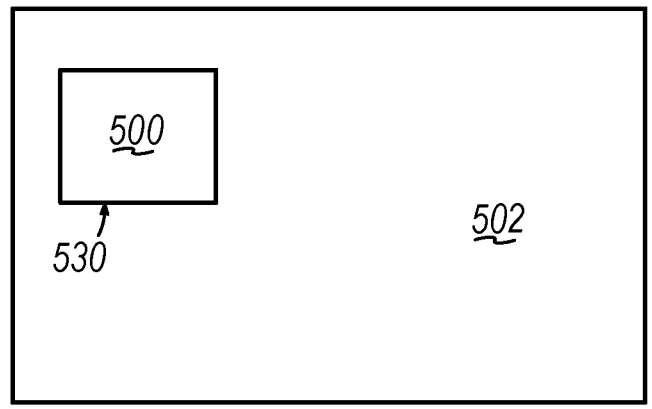
FIGS. 8A-8C depict a schematic view of a sliding window traversing an image.

The following describes examples of techniques that may be used to estimate parameters for SIM image reconstruction. Some of the techniques disclosed compensate for fringe peak lines that are distorted or bent due lens imperfections. Pattern lines that are supposed to be parallel begin that way near the center of the image but tend to converge or become non-parallel near the edge of the lens. This impacts illumination peak angle or orientation, illumination peak spacing, and phase offset. FIG. 8A illustrates dividing an image tile into overlapping regions referred to as sub-tiles or sub-windows or sub-fields. The sub-tiles are small enough that parameters may be set that will give satisfactory reconstruction for a whole sub-tile. In some versions, each sub-tile includes 512 by 512 pixels of the optical sensor. Larger or smaller numbers may be used, including but not limited to 256, 400, 1024, 2048 and 4096; or in a range from 256 to 4096 pixels. The sub-tiles may overlap by at least 2 pixels of the optical sensor. Larger or smaller numbers may be used. For example, for a 512-pixel wide window, up to a 256-pixel overlap may be used; and for 1024 pixels wide, up to a 512 overlap may be used.

The parameter estimation may be performed in two steps. First, parameter estimation may be performed for a near-center sub-tile of the image. Then, parameter estimation may be performed for other sub-tiles and compared to the near-center sub-tile to determine distortions and corrections for the distortions, relative to parameters for the near-center sub-tile.

Figure 6B:
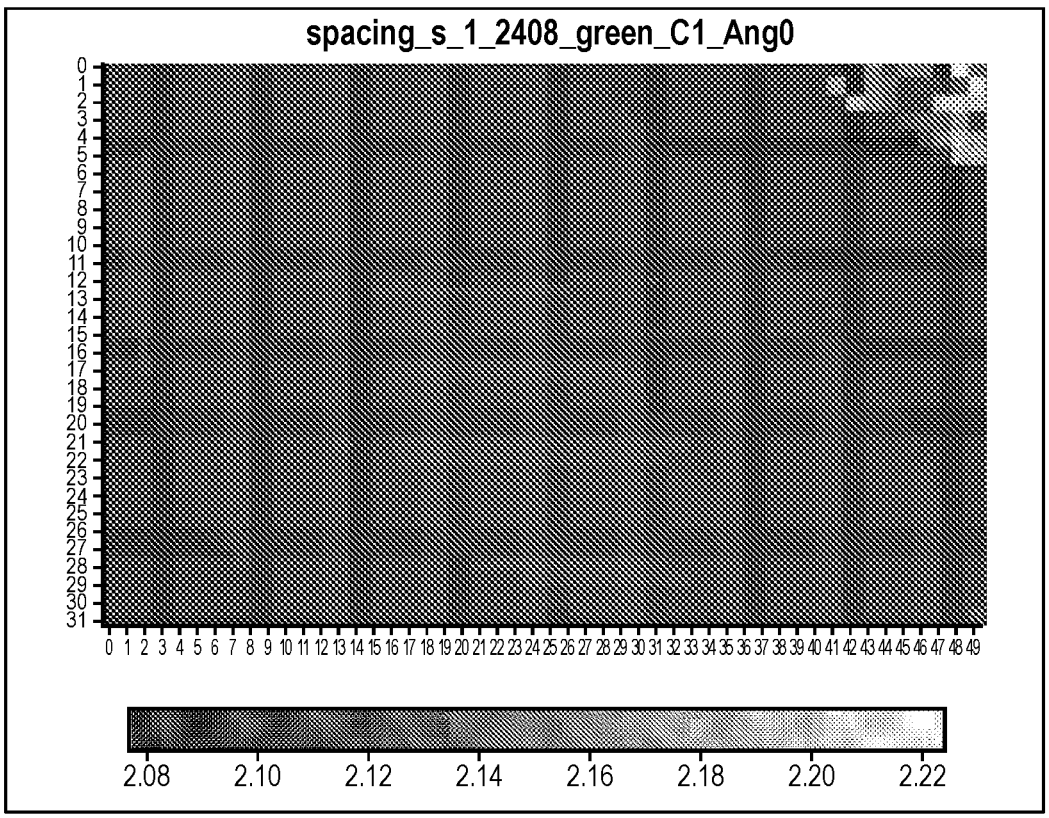
FIG. 6B illustrates a first set of measurements made to wavelengths of spacing between nominally parallel lines.
Figure 6C:
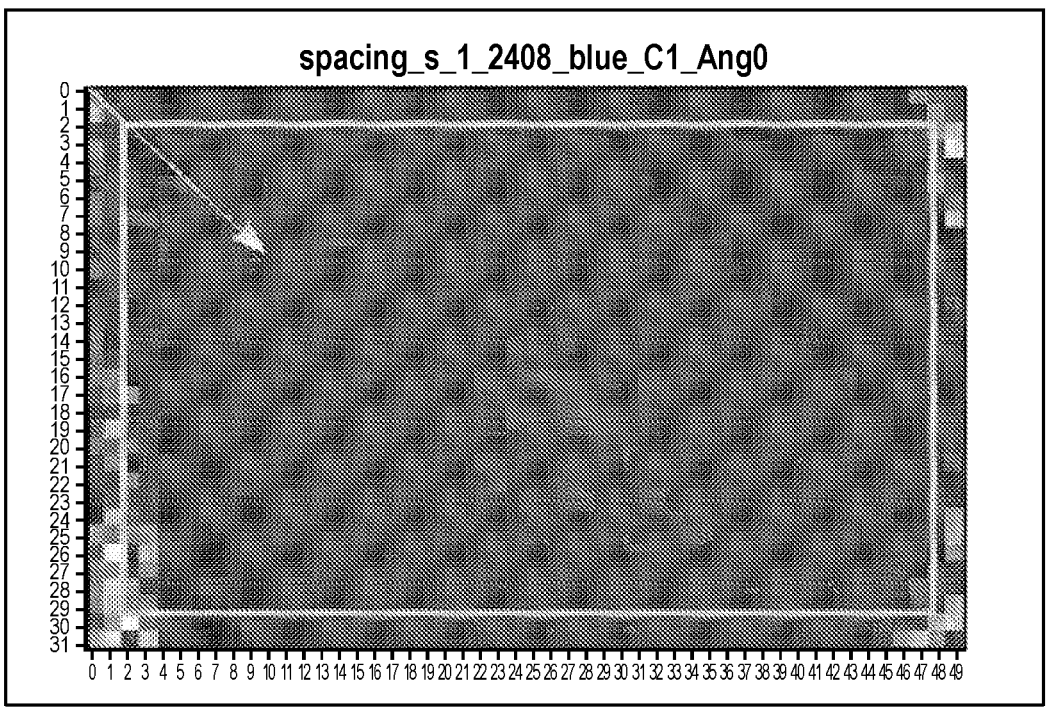
FIG. 6C depicts a second set of measurements made to wavelengths of spacing between nominally parallel lines.

FIGS. 6A to 6C illustrate physical aspects of the full field of view (FOV). In one implementation, the rectangular sensor is used that is 5472 pixels by 3694 pixels. Of course, a square sensor or a different size of sensor may be used, for example, 5472×5472 pixels, or 4800×4800 pixels. When a rectangular sensor is used, distortion is greatest closest to the edge of the lens. A lens often is round, so a rectangular sensor does not come as close to the edge of the lens on the long side as it does on the short side.

FIG. 6A presents two illustrations that show fringe spacing distortion across the full field of view (FOV). The FIG. 300 on the left is a simplified depiction 300 of bending parallel lines due to distortion of a lens that magnifies. The lines depicted are intended to be parallel in the image plane. Viewed through a lens, they appear to converge at right and left ends, relative to spacing in the center. The FIG. 302 on the right is another exaggerated example. In this figure the fringe lines are oriented diagonally between top left and bottom right corners. The fringe spacing is exaggerated to make it easier to see. The fringe lines converge at the top left and bottom right corners, relative to the center. For a particular manufacturer's lens, the fringe pattern may be non-uniform.

FIGS. 6B and 6C depict measurements of spacing in an image between nominally parallel fringe peaks in the image plane, for green and blue laser illumination. The color scale indicates a variation in spacing between 2.8 and 2.22. In both drawings, the color scale indicates that the center spacing between parallel lines is approximately 2.14. Irregularity under green wavelength illumination is seen in the top right-hand corner of FIG. 6B. More substantial irregularity under blue wavelength illumination is seen in FIG. 6C, along the right and left edges. In these figures, the fringe pattern was a series of parallel lines at an angle of 45°, from bottom left to top right of the figures. Thus, the spacing is measured in the direction of the arrow in FIG. 8C. These figures motivate correction of distortions caused by the lens. Since lenses are individually manufactured and mounted, calibration and correction of individual systems after assembly is desirable.

Figure 6D:
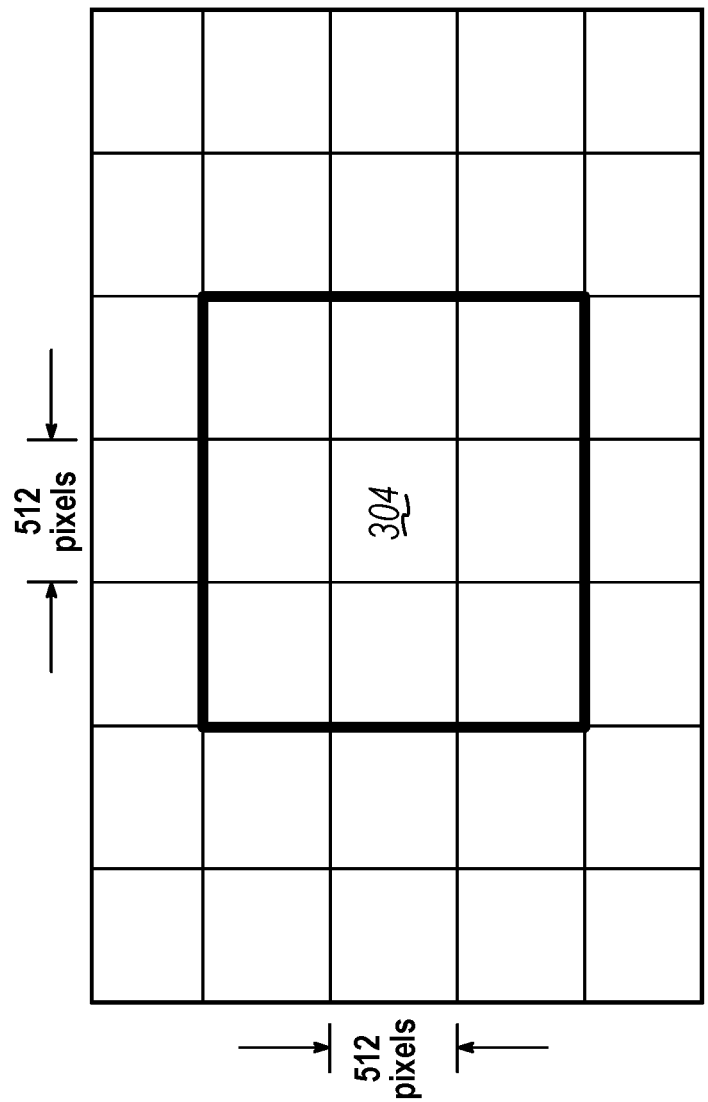
FIG. 6D depicts an example of sub-tiles or sub-fields of a full field of view (FOV) image.

FIG. 6D illustrates sub-tiles or subfields of the full field of view (FOV) in an image tile. In this figure, the sub-tile illustrated is 512 pixels by 512 pixels. These sub-tiles may subdivide the field of vision, shown, or may overlap. Sub-tiles may be larger or smaller. For instance, 400×400 and 1024×1024 pixel sub-tiles have been shown to be workable. The figure illustrates 5×7 sub-tiles. The larger sensor called out above may have 8×11 sub-tiles. Other configurations of sub-tiles such as 3×3, 5×5, 5×7, 9×9, 9×16 may be used. Larger sensors may be divided into more sub-tiles. The sub-tiles may overlap by at least 2 pixels of the optical sensor. Larger and smaller number of pixels may be used for overlapping between sub-tiles. For example, for a 512-pixel wide sub-tile, up to a 256-pixel overlap may be used, and for a 1024-pixel wide sub-tile, up to a 256-pixel overlap may be used. Consistent with FIGS. 6B and 6C, there are several candidate near-center sub-tiles 304, all in the sweet spot of the lens, including a center sub-tile in an odd×odd sub-tile array. As used herein, a near-center sub-tile either includes a center pixel of the sensor or abuts a sub-tile that includes the center pixel. In some optical systems that are flat and have small error, a sub-tile further from the ones adjoining the center sub-tile may be used as a reference without impacting the overall distortion compensation.

The technology disclosed includes mapping distortion measured over substantially the full field of view captured by the image sensor. Three parameters on which enhanced resolution SIM reconstruction from regularly structured illumination depend include fringe spacing, fringe angle, and phase displacement of the fringe pattern. These variables are also referred to as spacing, angle and phase offset of the structured illumination or grating pattern. The spacing and angle deviations from the center tile value may be fit across the full field of view using polynomial surfaces. Both quadratic and cubic surfaces have been investigated. Higher order polynomials also may be used.

Both the fringe spacing and fringe angle across the image tile may be fit by quadratic surfaces. Sensitivity analysis shows that quadratic surfaces fit very nearly as well as cubic surfaces. A quadratic surface is fit to the following equation (II):

$$f(x,y) = c0 + (c1*x) + (c2*y) + (c3*x*y) + (c4*x^2) + (c5*y^2) \quad \text{(II)}$$

One implementation of phase estimation adapts the technique proposed by Wicker et al. 2013, in their paper titled, "Phase Optimisation for Structured Illumination Microscopy", section 3. Equations from Lal et al. 2015 titled, "Structured Illumination Microscopy Image Reconstruction Algorithm," and from Wicker et. al. 2013 help explain Wicker phase estimation.

Equation (III) below, taken from Lal et al. 2015 separates three bands of frequency components: $\tilde{S}(k)\ \tilde{H}(k);\ \tilde{S}(k-p_\theta)\ \tilde{H}(k);\ \tilde{S}(k+p_\theta)\ \tilde{H}(k)$ from acquired images $\tilde{D}_{\theta,\varphi_1}(k)$, $\tilde{D}_{\theta,\varphi_2}(k)$, $\tilde{D}_{\theta,\varphi_3}(k)$. The mixing matrix uses estimates of the phases $\varphi_1$, $\varphi_2$, and $\varphi_3$ of images captured using a sinusoidal illumination intensity pattern $I_{\theta,\varphi}(r)$, corresponding to a pattern angle or orientation $\theta$. Wicker et. al. 2013 refer to phase for $n^{th}$ image at an orientation as $\varphi_n$. If phases are not known with sufficient precision, the unmixing or band separation process will imperfectly separate the spatial frequency components from the observed images $\tilde{D}_{\theta,\varphi_1}(k)$, $\tilde{D}_{\theta,\varphi_2}(k)$, $\tilde{D}_{\theta,\varphi_3}(k)$ in frequency domain. Practically, the three spatial frequency components $\tilde{S}(k)\ \tilde{H}(k);\ \tilde{S}(k-p_\theta)\ \tilde{H}(k);\ \tilde{S}(k+p_\theta)\ \tilde{H}(k)$ will contain more or less residual information from other components, as represented by the noise term provided through the following equation (III):

$$\begin{bmatrix} \tilde{D}_{\theta,\phi_1}(k) \\ \tilde{D}_{\theta,\phi_2}(k) \\ \tilde{D}_{\theta,\phi_3}(k) \end{bmatrix} = \frac{I_o}{2} M \begin{bmatrix} \tilde{S}(k)\tilde{H}(k) \\ \tilde{S}(k-p_\theta)\tilde{H}(k) \\ \tilde{S}(k+p_\theta)\tilde{H}(k) \end{bmatrix} + \begin{bmatrix} \tilde{N}_{\theta,\phi_1}(k) \\ \tilde{N}_{\theta,\phi_2}(k) \\ \tilde{N}_{\theta,\phi_3}(k) \end{bmatrix} \quad \text{(III)}$$

$$\text{where } M = \begin{bmatrix} 1 & -\frac{m}{2}e^{-i\phi_1} & -\frac{m}{2}e^{+i\phi_1} \\ 1 & -\frac{m}{2}e^{-i\phi_2} & -\frac{m}{2}e^{+i\phi_2} \\ 1 & -\frac{m}{2}e^{-i\phi_3} & -\frac{m}{2}e^{+i\phi_3} \end{bmatrix}$$

This formulation with three components follows from the Fourier transform for sine or cosine illumination. A different illumination function may change the equations.

Precise knowledge of the illuminating sinusoidal intensity pattern phases may therefore be important. As it is not always possible to precisely control these phases in experimental setup, it may be desirable to determine the illumination pattern phases from the acquired image data. Wicker et. al. 2013 present a phase estimation technique for SIM data acquired using coherent sinusoidal illumination at a selected frequency. Coherent illumination produces good pattern contrast from fine gratings with a very small illumination peak spacing 's', which enhances the reconstructed resolution. We retrieve illumination pattern phase of the $n^{th}$ image using the illumination pattern's peak frequency. The illumination pattern's peak frequency is also referred to as Fourier peak.

Equation (IV) below, from Wicker et. al. 2013, presents a generalized form of equation (II) with acquired images $\tilde{D}_n(\vec{k})$ over frequencies $\vec{k}$ in the frequency domain. Each image comprises of three components that are referred to as $\tilde{C}_{-1}(\vec{k})$, $\tilde{C}_0(\vec{k})$, $\tilde{C}_{+1}(\vec{k})$ superimposed with different phases. Note that these three components are the same three components as $\tilde{S}(k)\ \tilde{H}(k);\ \tilde{S}(k-p_\theta)\ \tilde{H}(k);\ \tilde{H}(k+p_\theta)\ \tilde{S}(k)$ in equation (III).

$$\tilde{D}_n(\vec{k}) = e^{-i\phi_n}\tilde{C}_{-1}(\vec{k}) + \tilde{C}_0(\vec{k}) + e^{i\phi_n}\tilde{C}_{+1}(\vec{k}) = \quad \text{(IV)}$$

$$\frac{c}{2}e^{-i\phi_n}\tilde{S}(\vec{k}+\vec{p})\tilde{h}(\vec{k}) + \tilde{S}(\vec{k})\tilde{h}(\vec{k}) + \frac{c}{2}e^{i\phi_n}\tilde{S}(\vec{k}-\vec{p})\tilde{h}(\vec{k})$$

Note that 'c' in equation (IV) is referred to as contrast of the illumination pattern. In the absence of noise, 'c' is the same as the modulation factor 'm' in mixing matrix M in equation (2). To determine $\varnothing_n$, the frequency $\vec{k}$ in equation (IV) is replaced with $\vec{p}$ which is peak frequency of illumination pattern, resulting in the following equation (V):

$$\phi_n \approx \arg\{\tilde{D}_n(\vec{p})\} = \arg\left\{\frac{c}{2}e^{-i\phi_n}\tilde{S}(2\vec{p})\tilde{h}(\vec{p}) + \tilde{S}(\vec{p})\tilde{h}(\vec{p}) + \frac{c}{2}e^{i\phi_n}\tilde{S}(0)\tilde{h}(\vec{p})\right\} \quad \text{(V)}$$

Equation (V) shows that pattern phase $\varnothing_n$ is approximately equal to the phase of the acquired image $\tilde{D}_n(\vec{p})$ over frequency $\vec{p}$. This approximate estimation of the pattern phase $\varnothing_n$ may yield good results when three guidelines are followed. First, the contrast c of the illumination pattern should to be sufficiently large. Second, the sample power spectrum should decrease sufficiently fast with growing frequency. When these two guidelines are followed, equation (V) is dominated by the last term and therefore, may be simplified to the following equation (VI):

$$\phi_n \approx \arg\{e^{i\phi_n} \tilde{S}(0) \tilde{h}(\vec{p})\} \quad (VI)$$

For any real valued sample, the center frequency $\tilde{S}(0)$ will be real valued. Further, if the point spread function (PSF) $h(\vec{r})$ is real and symmetrical, the optical transfer function (OTF) $\tilde{h}(\vec{k})$ will be real. An OTF is a convolution of the point spread function (PSF). A point spread function is the spatial domain version of the optical transfer function of the imaging system. The name "point spread function" indicates that all physical optical systems blur (spread) a point of light to some degree, with the amount of blurring being determined by the quality of the optical components. The resolution of the imaging system is limited by the size of the PSF. For asymmetrical PSFs the phases of the OTFs, should be taken into account.

Third, the OTF at the pattern frequency $\tilde{h}(\vec{p})$ should be sufficiently large to overcome noise. If the OTF is too small, noise in the acquired image may significantly alter the phase measured at $\vec{p}$. This phase estimation method cannot be used for pattern frequencies $\vec{p}$ outside for the support of the detection OTF. For such frequencies, $\tilde{h}(\vec{p})=0$.

An optical system's OTF may be determined experimentally. For example, Lal et al. 2015 compute the OTF by obtaining several images of samples with sparsely distributed 100 nm fluorescent microspheres. Intensity distribution corresponding to more than 100 microspheres were then super-imposed and averaged to obtain an approximation for the system PSF. Fourier transform of this PSF provides an estimate of system OTF. With this background, the phase estimation technique may be applied to sub-tiles.

It may be useful to estimate phase displacement of tiles relative to the full field of view (FOV), so that measurement of phase in one sub-tile may be extrapolated to other sub-tiles across the tile. The illumination peak angle and illumination peak spacing for the full FOV may be estimated from the illumination peak angle and illumination peak spacing of the sub-tile using the quadratic models presented above. The phase displacement may be less regular because it depends pixel geometry of sub-tiles, which may produce an irregular step function, instead of a smooth function. Phase estimates may be represented using a common frame of reference across sub-tiles of the full FOV image. Sub-tile coordinate spaces may be mapped to a the full FOV coordinate space.

B. Example of Calibration Method for SIM System

Various structural and operational parameters in a SIM optical system may adversely impact the quality of the SIM-reconstructed super resolution images. For instance, in any optical system containing lenses (e.g., within lens assembly 280 described above, some other lens that is integrated into camera system 140), at least one lens may include one or more structural aberrations, which may produce distortions in images captured by camera system 140. Calculations used in SIM reconstruction may be sensitive to distortions in source images that are captured using lenses with aberrations or using an optical assembly 200 having other aberrations. Increasing the field of view, using most of the lens instead of a sweet spot in the center, may enhance the susceptibility of SIM image reconstruction to the distortions caused by aberrations in the lens. Thus, examples described below provide systems and methods for detecting these lens aberrations; and making adjustments as needed during image processing to account for such aberrations.

The following description refers to treatment of SIM stacks in a method of processing. In the present example, each SIM stack includes twelve images—six images from two channels. For each channel, the set of six images includes three images taken with reflecting element 270 at three different positions along the linear path LP1 while grating switcher 250 is in the first state (e.g., as shown in FIGS. 5A-5B) and another three images taken with reflecting element 270 at the same three different positions along the linear path LP1 while grating switcher 250 is in the second state (e.g., as shown in FIGS. 5C-5D). Thus, the set of six images for each channel in a SIM stack represents three different phases for each of two different grating angles or illumination peak angles. Alternatively, any other suitable number of images may be used to form each SIM stack, and such images may differ from each other based on parameters other than those identified above.

To account for the imperfections within the optical elements, the process of the present example establishes a map of the distortions created by these imperfections. Since the imperfections will vary from system 100 to system 100, this mapping process is performed on an ad hoc basis for each system 100, such that each system 100 will have its own associated distortion map. While the present example is provided in the context of SIM images that have been captured using optical assembly 200 and system 100, the process described below may be implemented with various other kinds of optical assemblies and systems as will be apparent to those skilled in the art in view of the teachings herein. The process described below is not limited to the context of optical assembly 200 and system 100.

In order to generate the distortion map, the process analyzes a SIM stack of images using a "sliding window" approach. In this approach, the processor only analyzes a square crop or sub-tile of the SIM stack at a given moment, though the window slides along the field of view of the SIM stack throughout the process and iteratively analyzes several sub-tiles during the sliding of the window, such that the analyzed sub-tiles ultimately overlap with each other and collectively define a substantial portion (if not the entirety) of the field of view of the SIM stack. For each sub-tile yielded by the sliding window iterator, the full width half modulation (FWHM) and parameters are estimated for each channel and each angle. All of these estimated parameters and FWHM from each sub-tile are saved in a two-dimensional table. In some instances, the goal of the calibration process described herein is to measure modulation uniformity, spacing and grating angle uniformity (which feeds into a quadratic surface estimator to provide the distortion models), and phase deviation uniformity.

Figure 7:
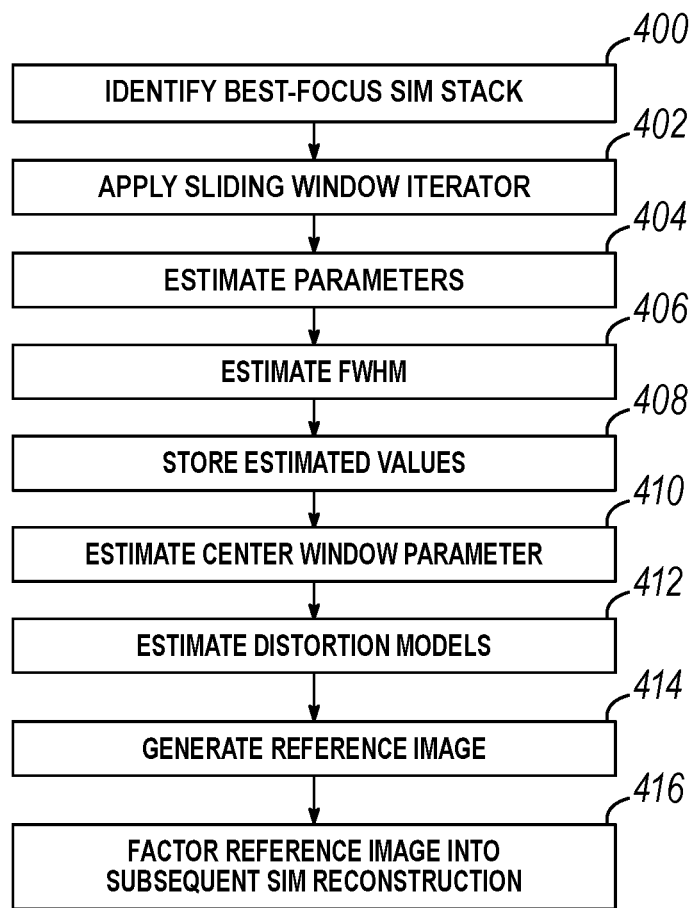
FIG. 7 depicts a flow chart of an example of a process for generating and applying a distortion model in SIM imaging.

The above-described process is shown in FIG. 7. As shown in block 400 of FIG. 7, the process begins with identifying the best-focus SIM stack. As noted above, SIM stacks may be captured at z-positions that are adjusted in certain increments (e.g., approximately 0.5 μm), such that one SIM stack may tend to provide better focus than the other SIM stacks due to the particular z-position of that SIM stack. Conventional methods known to those skilled in the art may be used to identify the best-focus SIM stack from the other SIM stacks. Having identified the best-focus SIM stack, the process may also define an "estimation window," which may include a window in the center of each image in the SIM stack (i.e., a central region of the view of each image in the SIM stack). This estimation window may be presumed to have the best image quality for parameter estimation purposes; and may be utilized later in the process as described below. The size and configuration of the estimation window may be predetermined.

Next, as shown in block 402 of FIG. 7, the process may apply a sliding window iterator to the identified best-focus SIM stack. This sliding window iterator may define a sliding window that only views a portion of the entire field of view of each image in the SIM stack at a given moment. The sliding window iterator may thus scan each image in the SIM stack by moving the sliding window across the entire field of view of each image in the SIM stack, processing only a portion of the image at a given moment. As noted below with reference to FIGS. 8A-8C, the sliding window may provide successive views that overlap with each other. The stride of the sliding window (e.g., distance and speed of movement), the size of the sliding window, and the configuration of the sliding window may be predetermined.

Figure 8B:
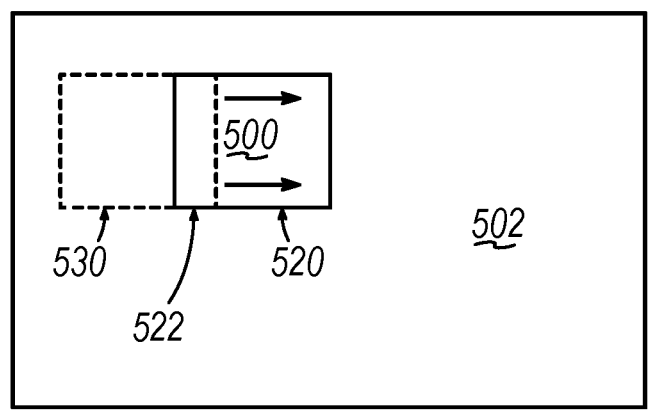
Figure 8C:
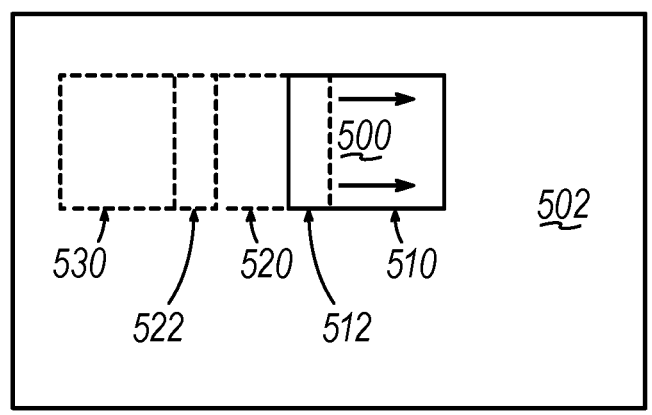

The sliding window iterator may capture data from each image in the SIM stack at any suitable frequency as the sliding window slides across the image. In some versions, the sliding window may capture data from regions of the image that overlap with each other. An example of this is shown in FIGS. 8A-8C, which shows a sliding window 500 traversing an image 502. As shown, the position 510 of sliding window 500 at a third data capture moment (FIG. 8C) has some spatial overlap 512 with the position 520 of sliding window at a second data capture moment (FIG. 8B); and the position 520 of sliding window 500 at the second data capture moment has some spatial overlap 522 with the position 530 of sliding window at a first data capture moment (FIG. 8A). In some implementations, the spatial overlap 512, 522 may be from approximately 60% to approximately 90% of the size of sliding window 500 to provide an optimal balance of speed and resolution. By way of further example, where sliding window 500 has a size of 512 pixels, the stride of sliding window 500 may be up to approximately 200 pixels. Alternatively, the spatial overlap 512, 522 may be less than approximately 60% of the size of sliding window 500 or greater than approximately 90% of the size of sliding window 500.

The sliding window iterator may ultimately yield a plurality of sub-tiles, representing portions of the base image corresponding to the data capture moments referred to above. Since each sub-tile is obtained from a corresponding image in a SIM stack (e.g., a stack of twelve base images), it may be beneficial to consider the sub-tiles in stacks corresponding to the SIM stack from which the sub-tiles were obtained. Such sub-tiles may be obtained from the same region of the base images in the SIM stack, such that the sub-tiles are spatially related. For shorthand purposes, this collection of spatially related sub-tiles may be referred to as a sub-tile SIM stack.

After the sliding window iterator has been applied, the process may then be applied to each sub-tile yielded by the sliding window iterator. In particular, and as shown in block 404 of FIG. 7, the process may provide parameter estimation for each channel and each grating angle in each sub-tile. The estimated parameters may include modulation, grating angle, spacing (i.e., local grating spacing or the local SIM illumination pattern periodicity), phase offset, phase deviation, or various other parameters. The parameter estimation may include a Fourier domain algorithm that first performs a rough search for the peak of the grating pattern (with various pre-processing to enhance the visibility of the peak). After the rough position is identified, a fine-resolution grid-search algorithm may be performed to maximize an objective function (the modulation value at given peak location). The process may also estimate the FWHM for each channel and each grating angle in each sub-tile, as shown in block 406 of FIG. 7.

Once the parameters have been estimated and the FWHM has been estimated for each angle and each grating angle for each sub-tile, these values may be saved for later use, as shown in block 408 of FIG. 7. In some versions, the values are stored in a two-dimensional table. Alternatively, any other suitable form of storage may be used. In some versions of the process, the process may end at this stage.

In some other versions of the process, the process continues by estimating the center window parameter for each base image in the SIM stack, as shown in block 410 of FIG. 7. In the present example, this part of the process is carried out for each base image in the SIM stack; rather than being carried out for each sub-tile as yielded by the sliding window iterator. This center window may be desirable to avoid distortions that may be more likely to occur near the edges and corners of each image.

Once the center window parameters have been estimated, the process may estimate distortion models, as shown in block 412 of FIG. 7. An example of how such distortion models may be estimated will be described below in further detail with reference to FIG. 9. The estimated distortion model may be used to generate a two-dimensional reference image, as shown in block 414 of FIG. 7. The two-dimensional reference image may show the known regions where the distortions occur in images captured using the optical assembly 200 and system 100 at hand. The two-dimensional reference image may thus provide a map that may be later used to determine where exactly the known distortions are located.

The above-described process may be carried out using a reference optical target, before optical assembly 200 and system 100 are used to capture SIM images of biological samples, etc., in sample container 110 during normal use of optical assembly 200 and system 100. In other words, the above-described process may be carried out during a first use of optical assembly and system 100, like a calibration procedure. Once the two-dimensional reference image has been generated using the above-described process, when SIM images of biological samples, etc., in sample container 110 are later captured during normal use of optical assembly 200 and system 100, the two-dimensional reference image may be factored into the SIM reconstruction mode, as shown in block 416 of FIG. 7. For instance, the SIM reconstruction process may provide adjustments during reconstruction to account for the known distortions that are mapped out in the two-dimensional reference image. By factoring in the known distortions as mapped in the two-dimensional reference image, the SIM reconstruction process may ultimately yield more accurate SIM images.

Figure 9:
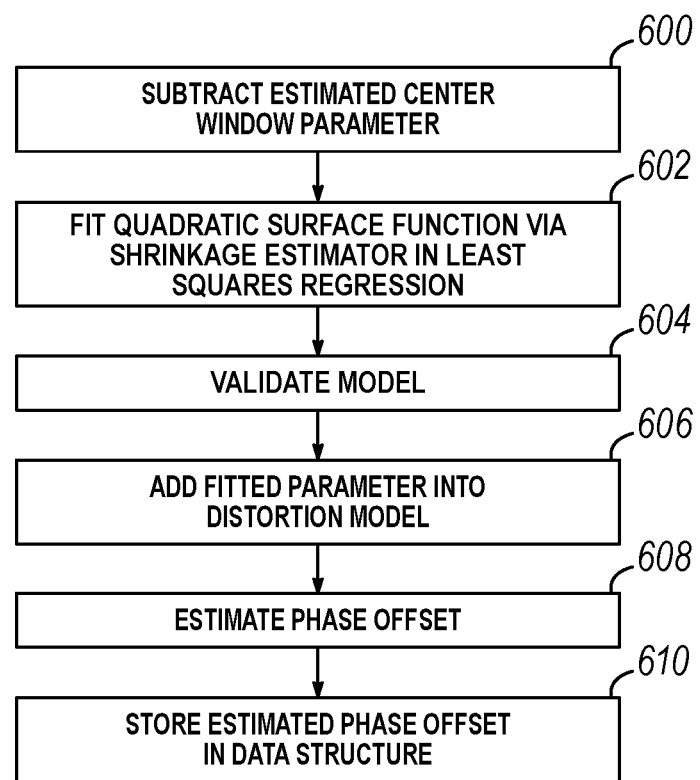
FIG. 9 depicts a flow chart showing an example of a process for estimating distortion models.

FIG. 9 shows an example of a process that may be carried out to estimate distortion models as described above with reference to block 412 of FIG. 7. FIG. 9 thus represents a sub-process that may be carried out during performance of the process shown in FIG. 7. In this example, the distortion model estimation process subtracts the estimated center window parameter from the two-dimensional tables referred to above, for each parameter, as shown in block 600 of FIG. 9. This includes converting absolute values into biases relative to the center window. In other words, raw estimated values of various SIM parameters (angle, spacing for each angle and channel combination) are converted into deviation parameters from the center window. To accomplish this, the process may divide the values by the center value (where the deviation is represented as a ratio of the parameter at a specific image subset location vs. that of the same parameter at the center window). Alternatively, the process may subtract the center value (where the deviation is represented as an offset from the center location).

Then, for each parameter, the process fits the quadratic surface function via a shrinkage estimator in a least squares regression, as shown in block 602 of FIG. 9. The process then validates the model by ensuring that the coefficient of determination ($R^2$) exceeds some threshold value (e.g., 95), as shown in block 604 of FIG. 9. For instance, a grating distortion metric may be characterized by sampling the fitted quadratic surface function at specific locations that are orthogonal to the grating direction (e.g., the direction of lines on phase mask 236, 246). While least squares regression is used to fit a quadratic surface function in the present example, any other suitable fitting algorithm may be used. Moreover, any other suitable functional form (i.e., other than a quadratic surface) may be used.

Returning to the present example, the process then adds the fitted parameter into a distortion model data structure, as shown in block 606 of FIG. 9. At this point, the process completes the estimation of the distortion model by estimating a phase offset, as shown in block 608 of FIG. 9, and storing the estimated phase offset in the data structure (e.g., table), as shown in block 610 of FIG. 9. During subsequent SIM image reconstruction, the stored estimated phase offset may be extrapolated to any other window on the SIM image by using the stored table.

C. Integration of Anti-Stokes Emission in SIM System

When a fluorophore is excited by light, such that the fluorophore fluoresces and thereby emits light, the spectrum of light emitted by the fluorophore is shifted relative to the spectrum of the excitation light. This shift is known as a Stokes shift. This may be attributed to the fact that the energy of a photon emitted by the fluorophore is less than the energy of the excitation photon absorbed by the fluorophore. This difference in energy may be caused by energy being lost through molecular vibrations occurring when the fluorophore is in the excited state. The lost energy may be dissipated as heat to surrounding solvent molecules as they collide with the excited fluorophore. In a Stokes shift scenario, the emitted light may have a wavelength that is longer than the wavelength of the excitation light.

In some cases, the energy of the photon emitted by the fluorophore is greater than the energy of the excitation photon absorbed by the fluorophore. Thus, the emitted light may have a wavelength that is shorter than the wavelength of the excitation light. In scenarios where the energy of the photon emitted by the fluorophore is greater than the energy of the excitation photon absorbed by the fluorophore, the emission by the fluorophore may be regarded as an Anti-Stokes emission.

Figure 10:
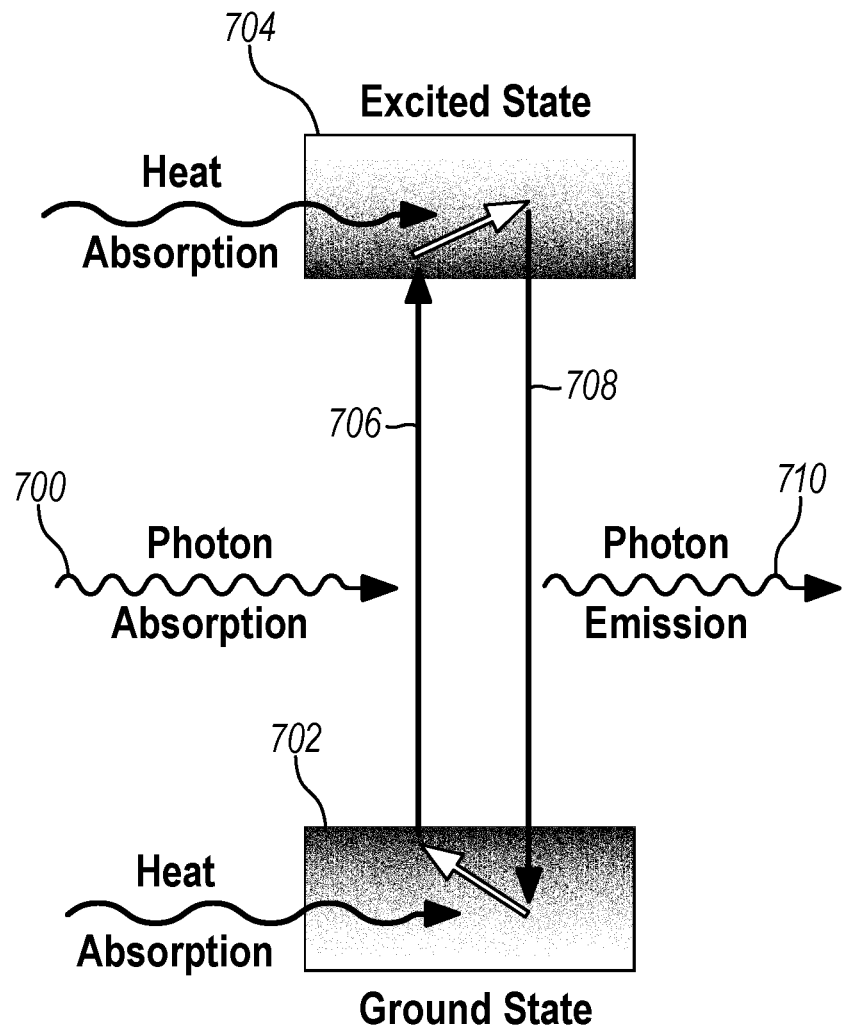
FIG. 10 depicts a schematic illustration of Anti-Stokes emission.

FIG. 10 shows a schematic illustration of Anti-Stokes emission from a dye containing a fluorophore. As shown, a pump photon 700 at relatively long wavelengths is absorbed from higher lying Boltzmann levels within a ground state manifold 702 to the bottom of an excited state S1 manifold 704, as represented by arrow 706. Subsequent thermalization amongst the vibrational levels of the S1 manifold 704 via phonon-induced transitions, followed by emission into the S0 ground state, as represented by arrow 708, results in the emission of a higher energy photon 710, together with subsequent cooling of the dye medium. In this example, "S0" and "S1" refer to refer to the singlet electronic states of the dye molecule. The S nomenclature refers to the total electronic spin of the molecular electronic state. Additionally, dye molecules can also support triplet spin states, identified by T1, T2, etc. In the present example, the focus is on absorption and spontaneous emission processes between the singlet electronic ground state configuration (S0) and the S1 excited singlet configuration. The electronic states of the dye molecule are also coupled to the vibrational modes of the molecule. The multiplicity of vibrational modes within a given electronic state may be referred to as a vibrational manifold. The term, "vibronic" may be used to refer to the electronic-vibrational states of a dye molecule.

In some implementations of system 100, an image target at the position of sample container 110 may include a first dye associated with a first channel (e.g., a first color) and a second dye associated with a second channel (e.g., a second color). In the present example, the first dye is Coumarin dye, the first channel is a blue channel, the second dye is Rhodamine dye, and the second channel is a green channel. Alternatively, any other suitable kinds of dyes or channel colors may be used. In the present example, when a light source (e.g., a blue laser in light emitting assembly 210) emits a light associated with the blue channel, SIM imaging may result in optical detection of blue laser generated fringes via fluorescence from the Coumarin dye into the blue channel. In addition, when a light source (e.g., a green laser in light emitting assembly 210) emits a light associated with the green channel, SIM imaging may result in optical detection of green laser interference fringes in the green channel via Stokes emission from the Rhodamine dye. However, a low modulation transfer function (MTF) at green emission wavelengths may result in weak fringe visibility or contrast, making it particularly difficult to detect the green laser generated fringes at certain wavelengths (e.g., 600 nm).

To overcome the low contrast that may be observed at green wavelengths due to Stokes shifting, it may be desirable to provide an approach that permits observation of green laser generated fringes at blue wavelengths. Since the blue channel supports an increased MTF product, the resulting green fringes may be observed with greater fidelity at higher contrast value than may otherwise be obtained. The approach of generating emission at shorter wavelengths than the actual laser excitation wavelength may rely on the phenomenon of Anti-Stokes fluorescence within a dye molecule. The Anti-Stokes process involves excitation of the dye molecule by a photon whose wavelength is substantially longer than the mean emission wavelength of the dye. In cases where an image target includes Coumarin blue dye, the Coumarin blue dye may be excited by a green laser at longer wavelengths (e.g., 520 nm). As shown in FIG. 10, green laser excitation of the Coumarin dye from higher-lying thermally-excited vibrational modes of the ground-state S0 manifold 702 to the bottom of the excited-state S1 manifold 704, followed by thermalization within the upper S1 manifold 704, leads to wavelength emission 710 much shorter than the initial excitation wavelength 700. This shorter-wavelength/higher-energy emission 710 may permit observation of green laser generated fringes at blue wavelengths. In other words, a camera tuned to the blue channel may observe blue emissions that are generated by a green laser, such that the excitation channel and the observation channel may differ from each other.

V. Miscellaneous

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Some versions of the examples described herein may be implemented using a computer system, which may include at least one processor that communicates with a number of peripheral devices via bus subsystem. These peripheral devices may include a storage subsystem including, for example, memory devices and a file storage subsystem, user interface input devices, user interface output devices, and a network interface subsystem. The input and output devices may allow user interaction with the computer system. The network interface subsystem may provide an interface to outside networks, including an interface to corresponding interface devices in other computer systems. User interface input devices may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system.

User interface output devices may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system to the user or to another machine or computer system.

A storage subsystem may store programming and data constructs that provide the functionality of some or all of the modules and methods described herein. These software modules may be generally executed by the processor of the computer system alone or in combination with other processors. Memory used in the storage subsystem may include a number of memories including a main random access memory (RAM) for storage of instructions and data during program execution and a read only memory (ROM) in which fixed instructions are stored. A file storage subsystem may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem in the storage subsystem, or in other machines accessible by the processor.

The computer system itself may be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the example of the computer system described herein is intended only as a specific example for purposes of illustrating the technology disclosed. Many other configurations of a computer system are possible having more or less components than the computer system described herein.

As an article of manufacture, rather than a method, a non-transitory computer readable medium (CRM) may be loaded with program instructions executable by a processor. The program instructions when executed, implement one or more of the computer-implemented methods described above. Alternatively, the program instructions may be loaded on a non-transitory CRM and, when combined with appropriate hardware, become a component of one or more of the computer-implemented systems that practice the methods disclosed.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A method including:
   receiving a plurality of images captured using structured illumination microscopy (SIM) in an optical system, each image of the plurality of images having a first field of view;
   defining a window, the window defining a second field of view representing a portion of the first field of view such that the second field of view is smaller than the first field of view;
   moving the window in relation to each image of a plurality of images;
   capturing a plurality of sub-tiles from each image of the plurality of images while moving the window in relation to each image of the plurality of images,
     each sub-tile of the plurality of plurality of sub-tiles representing a portion of the corresponding image of the plurality of images, the portion represented by each sub-tile of the plurality of sub-tiles being defined by the second field of view at a position corresponding to a moment at which the sub-tile of the plurality of sub-tiles is captured;
   estimating parameters associated with each sub-tile of the plurality of sub-tiles, the parameters comprising an angle, a spacing, and a phase offset; and storing the estimated parameters in a predetermined format.

2. The method of claim 1, the parameters further including a parameter selected from the group consisting of modulation and phase deviation.

3. The method of claim 1, further comprising:
estimating a full width at half maximum (FWHM) value associated with each sub-tile of the plurality of sub-tiles; and
storing the FWHM values in a predetermined format.

4. The method of claim 1, further comprising:
estimating a center window parameter, the center window parameter corresponding to a central region within the first field of view; and
estimating a distortion model based at least in part on a combination of the estimated parameters stored in the predetermined format and the estimated center window parameter, the estimating the distortion model including subtracting the estimated center window parameter from the estimated parameters stored in the predetermined format.

5. The method of claim 4, further comprising:
capturing a subsequent plurality of images using SIM in the optical system; and
generating a high-resolution image based at least in part on the plurality of images, the generating the high-resolution image including adjusting data from the subsequent plurality of images based at least in part on the estimated distortion model.

6. A method including:
receiving a plurality of images captured using structured illumination microscopy (SIM) in an optical system, each image of the plurality of images having a first field of view;
defining a window, the window defining a second field of view representing a portion of the first field of view such that the second field of view is smaller than the first field of view;
moving the window in relation to each image of a plurality of images;
capturing a plurality of sub-tiles from each image of the plurality of images while moving the window in relation to each image of the plurality of images, each sub-tile of the plurality of plurality of sub-tiles representing a portion of the corresponding image of the plurality of images, the portion represented by each sub-tile of the plurality of sub-tiles being defined by the second field of view at a position corresponding to a moment at which the sub-tile of the plurality of sub-tiles is captured;
estimating a first set of parameters for a first sub-tile of the plurality of sub-tiles,
the first set of parameters comprising an angle and a spacing;
mapping the first set of parameters to a second sub-tile of the plurality of sub-tiles;
estimating a phase offset for the second sub-tile of the plurality of sub-tiles using the mapped first set of parameters; and
storing the mapped first set of parameters and the estimated phase offset for the second sub-tile in a predetermined format.

7. The method of claim 6, the parameters further including a parameter selected from the group consisting of modulation, phase offset, and phase deviation.

8. The method of claim 6, further comprising:
estimating a full width at half maximum (FWHM) value associated with each sub-tile of the plurality of sub-tiles; and
storing the FWHM values in a predetermined format.

9. The method of claim 6, further comprising:
estimating a center window parameter, the center window parameter corresponding to a central region within the first field of view; and
estimating a distortion model based at least in part on a combination of the estimated parameters stored in the predetermined format and the estimated center window parameter, the estimating the distortion model including subtracting the estimated center window parameter from the estimated parameters stored in the predetermined format.

10. The method of claim 9, further comprising:
capturing a subsequent plurality of images using SIM in the optical system; and
generating a high-resolution image based at least in part on the plurality of images, the generating the high-resolution image including adjusting data from the subsequent plurality of images based at least in part on the estimated distortion model.

11. An apparatus comprising:
a first optical assembly to emit structured illumination toward a target, the first optical assembly including:
a light emitting assembly,
a first phase mask to impart a first pattern to light emitted by the light emitting assembly,
a second phase mask to impart a second pattern to light emitted by the light emitting assembly, and
a phase adjustment assembly to adjust a phase of light structured by the first phase mask and the second phase mask;
a second optical assembly, the second optical assembly including an image sensor to capture images of the target as illuminated by the first optical assembly; and
a processor, the processor to perform the following:
receive a plurality of images captured using the image sensor, each image of the plurality of images having a first field of view,
define a window, the window defining a second field of view representing a portion of the first field of view such that the second field of view is smaller than the first field of view,
move the window in relation to each image of a plurality of images,
capture a plurality of sub-tiles from each image of the plurality of images while moving the window in relation to each image of the plurality of images, each sub-tile of the plurality of plurality of sub-tiles representing a portion of the corresponding image of the plurality of images, the portion represented by each sub-tile of the plurality of sub-tiles being defined by the second field of view at a position corresponding to a moment at which the sub-tile of the plurality of sub-tiles is captured,
estimate a first set of parameters for a first sub-tile of the plurality of sub-tiles, the first set of parameters comprising an angle and a spacing,
map the first set of parameters to a second sub-tile of the plurality of sub-tiles,
estimate a phase offset for the second sub-tile of the plurality of sub-tiles using the mapped first set of parameters, and store the mapped first set of parameters and the estimated phase offset for the second sub-tile in a predetermined format.

12. The apparatus of claim 11, the first set of parameters further including a parameter selected from the group consisting of modulation, phase offset, and phase deviation.

13. The apparatus of claim 11, the processor further configured to:
estimate a full width at half maximum (FWHM) value associated with each sub-tile of the plurality of sub-tiles, and
store the estimated FWHM values in a predetermined format.

14. The apparatus of claim 11, the processor further to:
estimate a center window parameter, the center window parameter corresponding to a central region within the first field of view, and
estimate a distortion model based at least in part on a combination of the estimated parameters stored in the predetermined format and the estimated center window parameter, the estimating the distortion model including subtracting the estimated center window parameter from the estimated parameters stored in the predetermined format.

15. The apparatus of claim 14, the processor further to:
receive a subsequent plurality of images captured using the image sensor, and
generate a high-resolution image based at least in part on the plurality of images,
the generating the high-resolution image including adjusting data from the subsequent plurality of images based at least in part on the estimated distortion model.

16. An apparatus comprising:
an optical system, the optical system being operable to capture a plurality of images using structured illumination microscopy (SIM); and
a processor, the processor to perform the following:
receive a plurality of images captured using SIM in the optical system,
each image of the plurality of images having a first field of view,
define a window, the window defining a second field of view representing a portion of the first field of view such that the second field of view is smaller than the first field of view,
move the window in relation to each image of a plurality of images,
capture a plurality of sub-tiles from each image of the plurality of images while moving the window in relation to each image of the plurality of images, each sub-tile of the plurality of plurality of sub-tiles representing a portion of the corresponding image of the plurality of images, the portion represented by each sub-tile of the plurality of sub-tiles being defined by the second field of view at a position corresponding to a moment at which the sub-tile of the plurality of sub-tiles is captured,
estimate parameters associated with each sub-tile of the plurality of sub-tiles, the parameters comprising an angle, a spacing, and a phase offset, and
store the estimated parameters in a predetermined format.

17. The apparatus of claim 16, the first set of parameters further including a parameter selected from the group consisting of modulation and phase deviation.

18. The apparatus of claim 16, the processor further configured to:
estimate a full width at half maximum (FWHM) value associated with each sub-tile of the plurality of sub-tiles, and
store the estimated FWHM values in a predetermined format.

19. The apparatus of claim 16, the optical system comprising:
a first optical assembly to emit structured illumination toward a target, the first optical assembly including:
a light emitting assembly,
a first phase mask to impart a first pattern to light emitted by the light emitting assembly,
a second phase mask to impart a second pattern to light emitted by the light emitting assembly, and
a phase adjustment assembly to adjust a phase of light structured by the first phase mask and the second phase mask, and
a second optical assembly, the second optical assembly including an image sensor to capture images of the target as illuminated by the first optical assembly.

20. The apparatus of claim 16, the processor further to:
estimate a center window parameter, the center window parameter corresponding to a central region within the first field of view,
estimate a distortion model based at least in part on a combination of the estimated parameters stored in the predetermined format and the estimated center window parameter, the estimating the distortion model including subtracting the estimated center window parameter from the estimated parameters stored in the predetermined format,
receive a subsequent plurality of images captured using SIM in the optical system, and
generate a high-resolution image based at least in part on the plurality of images, the generating the high-resolution image including adjusting data from the subsequent plurality of images based at least in part on the estimated distortion model.

* * * * *